(12) United States Patent
Oliveira et al.

(10) Patent No.: US 7,394,472 B2
(45) Date of Patent: Jul. 1, 2008

(54) COMBINATORIAL EVALUATION OF SYSTEMS INCLUDING DECOMPOSITION OF A SYSTEM REPRESENTATION INTO FUNDAMENTAL CYCLES

(75) Inventors: Joseph S. Oliveira, Richland, WA (US); Janet B. Jones-Oliveira, Richland, WA (US); Colin G. Bailey, Wellington (NZ); Dean W. Gull, Seattle, WA (US)

(73) Assignee: Battelle Memorial Institute, Richland, WA (US)

( * ) Notice: Subject to any disclaimer, the term of this patent is extended or adjusted under 35 U.S.C. 154(b) by 449 days.

(21) Appl. No.: 11/247,424

(22) Filed: Oct. 11, 2005

(65) Prior Publication Data

US 2007/0052705 A1 Mar. 8, 2007

Related U.S. Application Data

(60) Provisional application No. 60/617,380, filed on Oct. 8, 2004.

(51) Int. Cl.
| | |
|---|---|
| *G06F 15/16* | (2006.01) |
| *G06F 17/50* | (2006.01) |
| *G06T 15/00* | (2006.01) |
| *G06T 17/00* | (2006.01) |
| *G06T 17/20* | (2006.01) |
| *G06T 15/20* | (2006.01) |
| *H04L 12/56* | (2006.01) |

(52) U.S. Cl. .................. 345/645; 345/420; 345/440; 709/201; 709/220; 709/249; 340/825.02; 370/254; 370/25; 370/408; 715/853

(58) Field of Classification Search ............... 709/201, 709/204, 220–224, 249, 250, 252; 345/420, 345/423, 440, 645; 340/825.02, 825, 2.1; 370/230, 229, 254–256, 400, 408, 457–458; 715/734–736, 853–854; 716/1, 3; 726/3; 382/158
See application file for complete search history.

(56) References Cited

U.S. PATENT DOCUMENTS 5,257,363 A 10/1993 Shapiro et al.

(Continued)

FOREIGN PATENT DOCUMENTS

EP 0 938 045 A1 8/1999

(Continued)

OTHER PUBLICATIONS

W.J. Heuett, Biochemical Reaction Network Analysis, Oct. 28, 2002, University of Washington, Department of Applied Mathematics.

(Continued)

*Primary Examiner*—Wesner Sajous
(74) *Attorney, Agent, or Firm*—Krieg DeVault LLP; L. Scott Paynter

(57) ABSTRACT

One embodiment of the present invention includes a computer operable to represent a physical system with a graphical data structure corresponding to a matroid. The graphical data structure corresponds to a number of vertices and a number of edges that each correspond to two of the vertices. The computer is further operable to define a closed pathway arrangement with the graphical data structure and identify each different one of a number of fundamental cycles by evaluating a different respective one of the edges with a spanning tree representation. The fundamental cycles each include three or more of the vertices.

30 Claims, 29 Drawing Sheets

U.S. PATENT DOCUMENTS

| | | | | |
|---|---|---|---|---|
| 5,282,147 | A | * | 1/1994 | Goetz et al. .................... 716/2 |
| 5,649,198 | A | | 7/1997 | Shibata et al. |
| 5,926,101 | A | * | 7/1999 | Dasgupta ............... 340/825.02 |
| 5,940,542 | A | | 8/1999 | Li et al. |
| 5,947,899 | A | | 9/1999 | Winslow et al. |
| 6,114,825 | A | * | 9/2000 | Katz ......................... 318/615 |
| 6,205,533 | B1 | | 3/2001 | Margolus |
| 6,647,141 | B1 | | 11/2003 | Li |
| 6,671,874 | B1 | | 12/2003 | Passova |
| 2003/0229807 | A1 | * | 12/2003 | Qiao et al. .................. 713/200 |
| 2004/0059736 | A1 | | 3/2004 | Willse et al. |
| 2004/0109407 | A1 | * | 6/2004 | Grover et al. ............... 370/218 |
| 2004/0263880 | A1 | | 12/2004 | Ito et al. |
| 2005/0075848 | A1 | | 4/2005 | Taylor et al. |
| 2005/0111386 | A1 | | 5/2005 | Jain et al. |

FOREIGN PATENT DOCUMENTS

EP          1 085 693 A2      3/2001

OTHER PUBLICATIONS

Mathematical Biology, Feb. 11, 2002, Computational Sciences & Mathematics.

Gjalt G. De Jong *, Bill Lin, A Communicating Petri Net Model for the Design of Concurrent Asynchronous Modules, IMEC Kapeldreef 75, B 3001 Leuven, Belgium.

Matthew C. Cary, Lattice Basis Reduction Algorithms and Applications, Feb. 27, 2002.

Understanding Spanning-Tree Protocol.

Linear Programming and Game Theory, Network Models.

James Oxley, What is a Matroid?, May 1, 2003, 1991 Mathematics Subject Classification, Department of Mathematics, Louisiana State University, Baton rouge, LA.

Gunter M. Ziegler*, Oriented Matroids Today, Sep. 10, 1998, Department of Mathematics, Technische Universitat Berlin, Berlin, Germany.

W. Imrich and P. Stadler, Minimum Cycle Bases of Product Graphs, Dept. of Mathematics and Applied Geometry, Montanuniversitat Leoben, Leoben, Austria; (Date Unknown).

J. Oliveira, C. Bailey, J. Jones-Oliveira, D. Dixon, An Algebraic-combinatorial Model for the Identification and Mapping of Biochemical Pathways, 2001 Society for Mathematical.

J. Oliveira et al., A Computational Model for the Identification of Biochemical Pathways in the Krebs Cycle, Journal of Computational Biology, vol. 10, Nov. 1, 2003, pp. 57-82.

* cited by examiner

| Place | Species | Type |
|---|---|---|
| $P_1$ | Acetyl CoA | Nucleotide cofactor |
| $P_2$ | Oxaloacetate: acetyl CoA | |
| $P_3$ | Oxaloacetate: acetyl CoA: citrate synthase | |
| $P_4$ | Citrate: CoA: citrate synthase | |
| $P_5$ | Citrate synthase | Enzyme |
| $P_6$ | Citryl CoA: citrate synthase | |
| $P_7$ | Citrate: CoA | |
| $P_8$ | Citrate | |
| $P_9$ | Citrate: aconitase | |
| $P_{10}$ | Isocitrate: aconitase | |
| $P_{11}$ | Aconitase | Enzyme |
| $P_{12}$ | cis-Aconitate: aconitase | |
| $P_{13}$ | Isocitrate | |
| $P_{14}$ | Isocitrate: isocitrate dehydrogenase | |
| $P_{15}$ | α-Ketoglutarate: isocitrate dehydrogenase | |
| $P_{16}$ | Isocitrate dehydrogenase | Enzyme |
| $P_{17}$ | Isocitrate: NAD: isocitrate dehydrogenase | |
| $P_{18}$ | Oxalosuccinate: NADH: isocitrate dehydrogenase | |
| $P_{19}$ | Oxalosuccinate: isocitrate dehydrogenase | |
| $P_{20}$ | α-Ketoglutarate | |
| $P_{21}$ | α-Ketoglutarate: α-ketoglutarate dehydrogenase complex | |
| $P_{22}$ | Succinyl CoA: α-ketoglutarate dehydrogenase complex | |
| $P_{23}$ | α-Ketoglutarate dehydrogenase complex | Enzyme |
| $P_{24}$ | α-Ketoglutarate: NAD: α-ketoglutarate dehydrogenase complex | |
| $P_{25}$ | α-Ketoglutarate: NAD: CoA: α-ketoglutarate dehydrogenase | |
| $P_{26}$ | Succinyl CoA: NADH: α-ketoglutarate dehydrogenase complex | |
| $P_{27}$ | Succinyl CoA | |
| $P_{28}$ | Succinyl CoA: succinyl CoA synthetase | |
| $P_{29}$ | Succinyl: succinyl CoA synthetase | |
| $P_{30}$ | Succinyl CoA synthetase | Enzyme |
| $P_{31}$ | Succinyl phosphate: succinyl CoA synthetase: CoA | |
| $P_{32}$ | Succinyl phosphate: succinyl CoA synthetase | |
| $P_{33}$ | Succinate: phosphate: succinyl CoA synthetase | |
| $P_{34}$ | Guanosine diphosphate [GDP] | Nucleotide cofactor |
| $P_{35}$ | Succinate: phosphate: GDP: succinyl CoA synthetase | |
| $P_{36}$ | Succinate: GTP: succinyl CoA synthetase | |
| $P_{37}$ | Guanosine triphosphate [GTP] | Nucleotide cofactor |
| $P_{38}$ | Succinate | |
| $P_{39}$ | Succinate: succinate dehydrogenase | |
| $P_{40}$ | Fumarate: succinate dehydrogenase | |
| $P_{41}$ | Succinate dehydrogenase | Enzyme |
| $P_{42}$ | Flavin adenine dinucleotide (oxidized form) [FAD] | Nucleotide cofactor |
| $P_{43}$ | Succinate: FAD: succinate dehydrogenase | |
| $P_{44}$ | Fumarate: FADH$_2$ : succinate dehydrogenase | |
| $P_{45}$ | Flavin adenine dinucleotide H$_2$ (reduced form) [FADH$_2$] | Nucleotide cofactor |
| $P_{46}$ | Fumarate | |
| $P_{47}$ | Fumarate: fumarase | |
| $P_{48}$ | L-malate: fumarase | |
| $P_{49}$ | Fumarase | Enzyme |
| $P_{50}$ | L-malate | |
| $P_{51}$ | L-malate: malate dehydrogenase | |
| $P_{52}$ | Oxaloacetate: malate dehydrogenase | |
| $P_{53}$ | Malate dehydrogenase | Enzyme |
| $P_{54}$ | L-malate: NAD: malate dehydrogenase | |
| $P_{55}$ | Oxaloacetate: NADH: Malate dehydrogenase | |
| $P_{56}$ | Oxaloacetate | |
| $P_{57}$ | Nicotinamide adenine dinucleotide H (reduced form) [NADH] | Nucleotide cofactor |
| $P_{58}$ | Nicotinamide adenine dinucleotide (oxidized form) [NAD] | Nucleotide cofactor |
| $P_{59}$ | Coenzyme A [CoA] | Nucleotide cofactor |

<sup>a</sup>Commonly used abbreviations are indicated in brackets.

Fig. 11

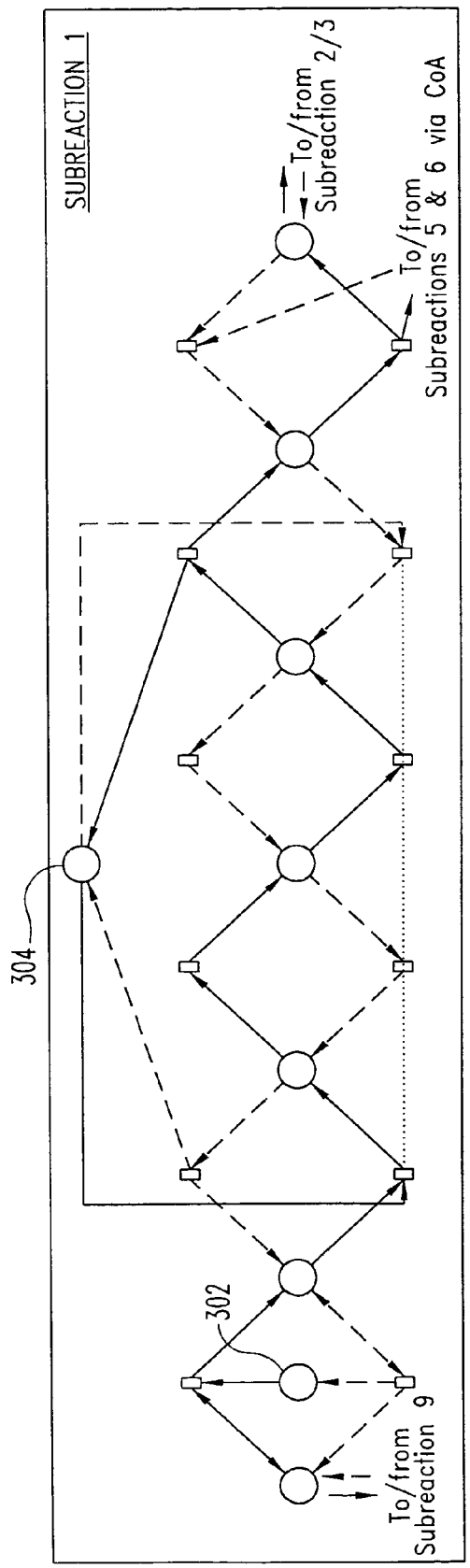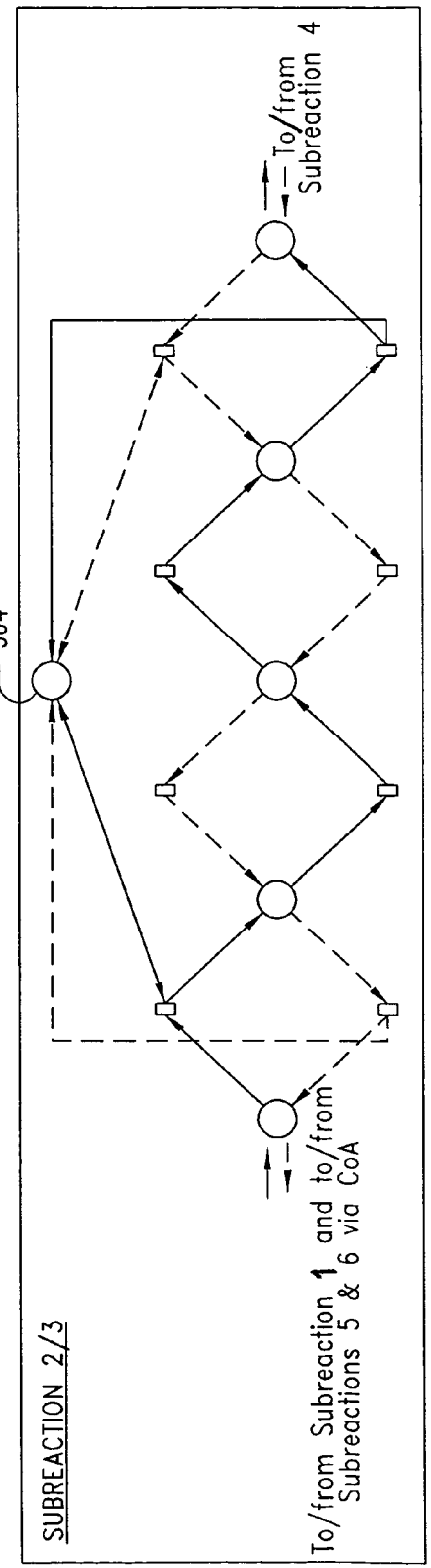
*Fig. 12*
*Fig. 13*

Fig. 20

| Transition | No. Occur. | Percent Occur. | Transition | No. Occur. | Percent Occur. |
|---|---|---|---|---|---|
| $t_{77},t_{78}$ | 10603 | 66.71 | $t_{35},t_{36}$ | 7655 | 48.16 |
| $t_{59},t_{60}$ | 10509 | 66.12 | $t_{27},t_{28}$ | 7653 | 48.15 |
| $t_{61},t_{62}$ | 10155 | 63.89 | $t_{49},t_{50}$ | 7617 | 47.92 |
| $t_{69},t_{70}$ | 10155 | 63.89 | $t_1,t_2$ | 5170 | 32.53 |
| $t_{71},t_{72}$ | 10155 | 63.89 | $t_{81},t_{82}$ | 3834 | 24.12 |
| $t_{75},t_{76}$ | 10155 | 63.89 | $t_{39},t_{40}$ | 3808 | 23.96 |
| $t_{21},t_{22}$ | 9543 | 60.04 | $t_{29},t_{30}$ | 3790 | 23.84 |
| $t_{85},t_{86}$ | 9003 | 56.64 | $t_{25},t_{26}$ | 3748 | 23.58 |
| $t_{11},t_{12}$ | 8854 | 55.71 | $t_{53},t_{54}$ | 3741 | 23.53 |
| $t_{13},t_{14}$ | 8694 | 54.70 | $t_{57},t_{58}$ | 3741 | 23.53 |
| $t_{19},t_{20}$ | 8694 | 54.70 | $t_{47},t_{48}$ | 3740 | 23.53 |
| $t_{43},t_{44}$ | 8127 | 51.13 | $t_{51},t_{52}$ | 3740 | 23.53 |
| $t_{45},t_{46}$ | 8049 | 50.64 | $t_{55},t_{56}$ | 3740 | 23.53 |
| $t_{37},t_{38}$ | 7865 | 49.48 | $t_{63},t_{64}$ | 3387 | 21.31 |
| $t_{33},t_{34}$ | 7833 | 49.28 | $t_{67},t_{68}$ | 3387 | 21.31 |
| $t_{23},t_{24}$ | 7801 | 49.08 | $t_{65},t_{66}$ | 3386 | 21.30 |
| $t_{79},t_{80}$ | 7787 | 48.99 | $t_{73},t_{74}$ | 3386 | 21.30 |
| $t_{83},t_{84}$ | 7787 | 48.99 | $t_{15},t_{16}$ | 2899 | 18.24 |
| $t_{31},t_{32}$ | 7763 | 48.84 | $t_{17},t_{18}$ | 2899 | 18.24 |
| $t_{41},t_{42}$ | 7761 | 48.83 | $t_5,t_6$ | 2586 | 16.27 |
| $t_3,t_4$ | 7755 | 48.79 | $t_7,t_8$ | 2586 | 16.27 |
| $t_9,t_{10}$ | 7755 | 48.79 | | | |

*Fig. 21*

| Place | No. Occur. | Percent Occur. | Place | No. Occur. | Percent Occur. |
|---|---|---|---|---|---|
| $P_{51}$ | 14549 | 91.54 | $P_{59}$ | 11031 | 69.40 |
| $P_{29}$ | 14249 | 89.65 | $P_{3}$ | 10341 | 65.06 |
| $P_{7}$ | 14023 | 88.23 | $P_{4}$ | 10341 | 65.06 |
| $P_{39}$ | 13541 | 85.20 | $P_{2}$ | 10339 | 65.05 |
| $P_{40}$ | 13541 | 85.20 | $P_{56}$ | 10338 | 65.04 |
| $P_{47}$ | 13541 | 85.20 | $P_{27}$ | 8618 | 54.22 |
| $P_{48}$ | 13541 | 85.20 | $P_{20}$ | 8030 | 50.52 |
| $P_{38}$ | 13538 | 85.18 | $P_{53}$ | 7668 | 48.24 |
| $P_{46}$ | 13538 | 85.18 | $P_{23}$ | 7636 | 48.04 |
| $P_{50}$ | 13538 | 85.18 | $P_{19}$ | 7580 | 47.69 |
| $P_{14}$ | 13333 | 83.89 | $P_{16}$ | 7496 | 47.16 |
| $P_{52}$ | 12949 | 81.47 | $P_{35}$ | 7481 | 47.07 |
| $P_{22}$ | 11857 | 74.60 | $P_{36}$ | 7481 | 47.07 |
| $P_{28}$ | 11789 | 74.17 | $P_{30}$ | 7480 | 47.06 |
| $P_{57}$ | 11735 | 73.83 | $P_{32}$ | 7480 | 47.06 |
| $P_{21}$ | 11677 | 73.47 | $P_{33}$ | 7480 | 47.06 |
| $P_{25}$ | 11673 | 73.44 | $P_{43}$ | 6773 | 42.61 |
| $P_{58}$ | 11663 | 73.38 | $P_{44}$ | 6773 | 42.61 |
| $P_{54}$ | 11621 | 73.12 | $P_{41}$ | 6772 | 42.60 |
| $P_{55}$ | 11621 | 73.12 | $P_{49}$ | 6772 | 42.60 |
| $P_{9}$ | 11593 | 72.94 | $P_{11}$ | 5798 | 36.48 |
| $P_{10}$ | 11593 | 72.94 | $P_{12}$ | 5798 | 36.48 |
| $P_{8}$ | 11590 | 72.92 | $P_{5}$ | 5172 | 32.54 |
| $P_{13}$ | 11590 | 72.92 | $P_{6}$ | 5172 | 32.54 |
| $P_{26}$ | 11569 | 72.79 | $P_{1}$ | 1 | 0.006 |
| $P_{15}$ | 11553 | 72.69 | $P_{34}$ | 1 | 0.006 |
| $P_{17}$ | 11549 | 72.66 | $P_{37}$ | 1 | 0.006 |
| $P_{24}$ | 11425 | 71.88 | $P_{42}$ | 1 | 0.006 |
| $P_{18}$ | 11401 | 71.73 | $P_{45}$ | 1 | 0.006 |
| $P_{31}$ | 11357 | 71.45 | | | |

*Fig. 22*

| Cycle No. | Length | Cycle Specification | Cycle Subreaction Description |
|---|---|---|---|
| 1 | 3 | $p_{49} \xrightarrow{l_{21}} p_{47} \xrightarrow{l_{24}} p_{18} \xrightarrow{l_{75}} p_{49}$ | $p_{49}$, Fumarase enzyme |
| 2 | 4 | $p_{11} \xrightarrow{l_{13}} p_9 \xrightarrow{l_{16}} p_{13} \xrightarrow{l_{17}} p_{10} \xrightarrow{l_{20}} p_{11}$ | $p_{11}$, Aconitase enzyme |
| 3 | 4 | $p_5 \xrightarrow{l_4} p_3 \xrightarrow{l_5} p_6 \xrightarrow{l_8} p_4 \xrightarrow{l_9} p_5$ | $p_5$, Citrate synthase enzyme |
| 4 | 5 | $p_{39} \xrightarrow{l_{63}} p_{43} \xrightarrow{l_{66}} p_{44} \xrightarrow{l_{67}} p_{40} \xrightarrow{l_{70}} p_{41} \xrightarrow{l_{62}} p_{39}$ | $p_{41}$, Succinate dehydrogenase enzyme |
| 5 | 5 | $p_{54} \xrightarrow{l_{61}} p_{35} \xrightarrow{l_{64}} p_{52} \xrightarrow{l_{65}} p_{53} \xrightarrow{l_{61}} p_{31} \xrightarrow{l_{60}} p_{54}$ | $p_{53}$, Malate dehydrogenase enzyme |
| 6 | 6 | $p_{36} \xrightarrow{l_{42}} p_{22} \xrightarrow{l_{45}} p_{23} \xrightarrow{l_{54}} p_{21} \xrightarrow{l_{58}} p_{25} \xrightarrow{l_{59}} p_{26}$ | $p_{25}$, Ketoglutarate dehydrogenase complex enzyme |
| 7 | 6 | $p_{18} \xrightarrow{l_{28}} p_{19} \xrightarrow{l_{29}} p_{15} \xrightarrow{l_{32}} p_{24} \xrightarrow{l_{24}} p_{17} \xrightarrow{l_{25}} p_{18}$ | $p_{16}$, Isocitrate dehydrogenase enzyme |
| 8 | 7 | $p_{36} \xrightarrow{l_{44}} p_{28} \xrightarrow{l_{47}} p_{27} \xrightarrow{l_{50}} p_{31} \xrightarrow{l_{47}} p_{33} \xrightarrow{l_{54}} p_{35} \xrightarrow{l_{58}} p_{25} \xrightarrow{l_{59}} p_{26}$ | Like cycle No. 6 with CoA bypass |
| 9 | 8 | $p_{30} \xrightarrow{l_{46}} p_{28} \xrightarrow{l_{47}} p_{27} \xrightarrow{l_{50}} p_{31} \xrightarrow{l_{54}} p_{33} \xrightarrow{l_{55}} p_{36} \xrightarrow{l_{58}} p_{29} \xrightarrow{l_{59}} p_{30}$ | $p_{30}$, Succinyl CoA synthetase enzyme |
| 10 | 31 | $p_{26} \xrightarrow{l_{38}} p_{19} \xrightarrow{l_{29}} p_{15} \xrightarrow{l_{32}} p_{20} \xrightarrow{l_{35}} p_{21} \xrightarrow{l_{38}} p_{24} \xrightarrow{l_{43}} p_{33} \xrightarrow{l_{55}} p_{35} \xrightarrow{l_{58}} p_{36}$ ... $p_{47}$ | "Backbone" with CoA bypass |
| 11 | 43 | $p_{18} \xrightarrow{l_{28}} p_{19} \xrightarrow{l_{29}} p_{15} \xrightarrow{l_{32}} p_{20} \xrightarrow{l_{35}} p_{21} \xrightarrow{l_{38}} p_{24} \xrightarrow{l_{43}} p_{33} \xrightarrow{l_{55}} p_{35} \xrightarrow{l_{58}} p_{36}$ ... $p_{13}$ | "Backbone" |

| Place | No. Occur. | Percent Occur. | Place | No. Occur. | Percent Occur. |
|---|---|---|---|---|---|
| $P_0$ | 26 | 100.00 | $P_{10}$ | 2 | 7.69 |
| $P_1$ | 26 | 100.00 | $P_{11}$ | 2 | 7.69 |
| $P_{99}$ | 26 | 100.00 | $P_{14}$ | 2 | 7.69 |
| $P_2$ | 25 | 96.15 | $P_6$ | 1 | 3.84 |
| $P_3$ | 16 | 61.53 | $P_{12}$ | 1 | 3.84 |
| $P_{30}$ | 12 | 46.15 | $P_{18}$ | 1 | 3.84 |
| $P_9$ | 11 | 42.30 | $P_{22}$ | 1 | 3.84 |
| $P_8$ | 9 | 34.61 | $P_{24}$ | 1 | 3.84 |
| $P_{23}$ | 8 | 30.76 | $P_{25}$ | 1 | 3.84 |
| $P_{13}$ | 7 | 26.92 | $P_{28}$ | 1 | 3.84 |
| $P_{34}$ | 7 | 26.92 | $P_{29}$ | 1 | 3.84 |
| $P_4$ | 6 | 23.07 | $P_{31}$ | 1 | 3.84 |
| $P_{20}$ | 4 | 15.38 | $P_{32}$ | 1 | 3.84 |
| $P_{27}$ | 4 | 15.38 | $P_{35}$ | 1 | 3.84 |
| $P_{37}$ | 4 | 15.38 | $P_{36}$ | 1 | 3.84 |
| $P_{38}$ | 4 | 15.38 | $P_{40}$ | 1 | 3.84 |
| $P_{44}$ | 3 | 11.53 | $P_{41}$ | 1 | 3.84 |
| $P_5$ | 2 | 7.69 | $P_{42}$ | 1 | 3.84 |
| $P_7$ | 2 | 7.69 | $P_{75}$ | 1 | 3.84 |

*Fig. 29*

| Transition | No. Occur. | Percent Occur. | Transition | No. Occur. | Percent Occur. |
|---|---|---|---|---|---|
| $t_1$ | 26 | 100.00 | $t_{26}$ | 1 | 3.84 |
| $t_{52}$ | 26 | 100.00 | $t_{31}$ | 1 | 3.84 |
| $t_2$ | 25 | 96.15 | $t_{32}$ | 1 | 3.84 |
| $t_4$ | 16 | 61.53 | $t_{35}$ | 1 | 3.84 |
| $t_7$ | 12 | 46.15 | $t_{36}$ | 1 | 3.84 |
| $t_{22}$ | 11 | 42.30 | $t_{37}$ | 1 | 3.84 |
| $t_{25}$ | 9 | 34.61 | $t_{38}$ | 1 | 3.84 |
| $t_{27}$ | 8 | 30.76 | $t_{39}$ | 1 | 3.84 |
| $t_5$ | 7 | 26.92 | $t_{40}$ | 1 | 3.84 |
| $t_{28}$ | 7 | 26.92 | $t_{41}$ | 1 | 3.84 |
| $t_{10}$ | 6 | 23.07 | $t_{42}$ | 1 | 3.84 |
| $t_6$ | 4 | 15.38 | $t_{43}$ | 1 | 3.84 |
| $t_{12}$ | 4 | 15.38 | $t_{44}$ | 1 | 3.84 |
| $t_{30}$ | 4 | 15.38 | $t_{45}$ | 1 | 3.84 |
| $t_{19}$ | 3 | 11.53 | $t_{46}$ | 1 | 3.84 |
| $t_{33}$ | 3 | 11.53 | $t_{47}$ | 1 | 3.84 |
| $t_3$ | 2 | 7.69 | $t_{48}$ | 1 | 3.84 |
| $t_{11}$ | 2 | 7.69 | $t_{49}$ | 1 | 3.84 |
| $t_{14}$ | 2 | 7.69 | $t_{50}$ | 1 | 3.84 |
| $t_{29}$ | 2 | 7.69 | $t_{51}$ | 1 | 3.84 |
| $t_{34}$ | 2 | 7.69 | $t_{53}$ | 1 | 3.84 |
| $t_8$ | 1 | 3.84 | $t_{54}$ | 1 | 3.84 |
| $t_9$ | 1 | 3.84 | $t_{55}$ | 1 | 3.84 |
| $t_{13}$ | 1 | 3.84 | $t_{56}$ | 1 | 3.84 |
| $t_{15}$ | 1 | 3.84 | $t_{57}$ | 1 | 3.84 |
| $t_{16}$ | 1 | 3.84 | $t_{58}$ | 1 | 3.84 |
| $t_{17}$ | 1 | 3.84 | $t_{59}$ | 1 | 3.84 |
| $t_{18}$ | 1 | 3.84 | $t_{60}$ | 1 | 3.84 |
| $t_{20}$ | 1 | 3.84 | $t_{61}$ | 1 | 3.84 |
| $t_{21}$ | 1 | 3.84 | $t_{62}$ | 1 | 3.84 |
| $t_{23}$ | 1 | 3.84 | $t_{63}$ | 1 | 3.84 |
| $t_{24}$ | 1 | 3.84 | | | |

| Cycle No. | Cycle Specification |
|---|---|
| 1a | $p_9 \xrightarrow{t_{24}} \underline{p_{75}} \xrightarrow{t_{2400}} p_9$ |
| 2a | $p_{30} \xrightarrow{t_{22}} p_9 \xrightarrow{t_{2200}} p_{30}$ |
| 3a | $p_7 \xrightarrow{t_{1400}} p_{20} \xrightarrow{t_{14}} p_7$ |
| 4a | $p_{30} \xrightarrow{t_{700}} p_3 \xrightarrow{t_7} p_{30}$ |
| 5a | $p_1 \xrightarrow{t_2} p_2 \xrightarrow{t_{200}} p_1$ |
| 6a | $p_2 \xrightarrow{t_5} p_{13} \xrightarrow{t_{500}} p_2$ |
| 7a | $p_2 \xrightarrow{t_4} p_3 \xrightarrow{t_{400}} p_2$ |
| 8a | $\underline{p_0} \xrightarrow{t_{4000}} \underline{p_{24}} \xrightarrow{t_{40}} \underline{p_0}$ |
| 9a | $\underline{p_0} \xrightarrow{t_{4000}} \underline{p_{75}} \xrightarrow{t_{45}} \underline{p_0}$ |
| 10a | $p_{20} \xrightarrow{t_{1200}} p_4 \xrightarrow{t_{12}} p_{20}$ |
| 11a | $p_7 \xrightarrow{t_{18}} \underline{p_{24}} \xrightarrow{t_{1800}} p_7$ |
| 12a | $p_{13} \xrightarrow{t_{10}} p_4 \xrightarrow{t_{1000}} p_{13}$ |

COMBINATORIAL EVALUATION OF SYSTEMS INCLUDING DECOMPOSITION OF A SYSTEM REPRESENTATION INTO FUNDAMENTAL CYCLES

CROSS-REFERENCE TO RELATED APPLICATIONS

The present application claims the benefit of U.S. Provisional Patent Application No. 60/617,380 filed 8 Oct. 2004, which is hereby incorporated by reference in its entirety.

GOVERNMENT RIGHTS

This invention was made with Government support under Contract Number DE-AC0676RL01830 awarded by the U.S. Department of Energy. The Government has certain rights in the invention.

BACKGROUND

The present invention relates to data processing and more particularly, but not exclusively, relates to a unique methodology for the decomposition of a network-of-networks representation of a system into a set of fundamental cycles, where the fundamental cycles are used to completely characterize and control both linear and nonlinear systems.

There is an ongoing desire to more meaningfully evaluate and control complex systems behaviors. Frequently, these systems can be modeled as a finite group of constituents that interact in a predictable manner based on certain physical rules or conditions. Even so, the application of existing mathematical tools to fully evaluate these systems can be time/cost prohibitive, and sometimes can provide misleading results due to round-off errors or the like. Also, current evaluation/simulation schemes are often not up to the task of analyzing the impact that multiple, simultaneous perturbations can have on such systems. Accordingly, there continues to be a demand for further contributions in this area of technology.

SUMMARY

One embodiment of the present invention is a unique data processing technique. Other embodiments include unique apparatus, devices, and methods for processing data.

A further embodiment comprises: representing a network with a graphical data structure corresponding to a matroid; defining a number of closed pathways with the graphical data structure; and recursively processing the graphical data structure to decompose the closed pathways into a minimal cycle set representative of the complex network.

Another embodiment includes a computer that has means for representing a physical system with a graphic data structure corresponding to a number of vertices and a number of edges, means for defining a closed pathway arrangement with the graphical data structure, and means for identifying each different one of a number of the fundamental cycles of the closed pathway arrangement based on a spanning tree representation and a different respective one of the edges.

Yet another embodiment comprises: preparing a model of a physical system and decomposing a closed pathway structure defined by the model into a minimal set of fundamental cycles that are unique relative to one another. This decomposition includes identifying a number of unique two-cycles each including two different members of the vertices and successively evaluating different ones of the edges to identify the fundamental cycles belonging to the minimal set that each include three or more different members of the vertices. In one form, the model corresponds to a graphical dataset defining a number of vertices that are each representative of a different system variable and a number of edges that are each representative of a conditional transition path between two of the vertices.

In another embodiment, a computer models a physical network with a graphical data structure representative of a matroid that corresponds to a closed pathway arrangement. This physical network includes several spatially separated nodes coupled together by a number of corresponding links that each operatively couple two of the nodes to provide for network transmission therebetween. The computer processes the graphical data structure relative to a spanning tree representation to decompose the closed pathway arrangement into a minimal cycle set representative of all pathways thereof.

In a further embodiment, a computer executes operating logic to prepare a model of a physical system that corresponds to a graphical dataset defining a number of vertices and a number of edges. The vertices are each representative of a different system state variable and the edges are each representative of a conditional flow path between two of the vertices. The model defines a closed pathway structure including a plurality of closed pathways. As it is executed, the operating logic decomposes the closed pathway structure of the model into a minimal set of fundamental cycles numbering less than the plurality of closed pathways. These fundamental cycles are unique relative to one another. Decomposition of the closed pathway structure includes identifying a number of unique two-cycles each including two different members of the vertices and successively evaluating different ones of the edges to identify the fundamental cycles belonging to the minimal set.

A different embodiment includes: representing a physical system with a graphic data structure corresponding to a number of vertices and a number of edges, the edges each corresponding to two of the vertices; defining a closed pathway arrangement with the graphical data structure; and for each different one of a number of unique fundamental cycles of the closed pathway arrangement, identifying the different one of the fundamental cycles as a function of a spanning tree representation and a different one of the edges, where the fundamental cycles each include three or more of the vertices.

Accordingly, one object of the present invention is to provide a unique data processing technique.

Another object is to provide a unique apparatus, device, or method for processing data and/or modeling a system.

Further objects, embodiments, forms, features, aspects, benefits, and advantages of the present invention will become apparent from the drawings and detailed description contained herein.

BRIEF DESCRIPTION OF THE VIEWS OF THE DRAWING

FIGS. 3-5 are diagrammatic views relating to Petri net representation and corresponding incidence matrices for biochemical reactions that can be evaluated under the procedure of FIG. 2.

FIG. 11 is chart listing places for the Petri net representation of FIG. 10.

FIGS. 12-19 are more detailed Petri net representations of subreactions 1, 2/3, 4, 5, 6, 7, 8, and 9; respectively, of the Krebs cycle depicted in FIG. 10.

FIG. 20 is a diagram of a portion of an incidence matrix for the Petri net representation of the Krebs cycle represented in FIG. 10.

FIGS. 21 and 22 are charts listing occurrence of transitions and places, respectively, in the minimal cycle set for the Krebs cycle represented in FIG. 10; where the minimal cycle set was determined in accordance with the routine of FIGS. 8 and 9.

FIG. 23 is a diagrammatic view of the "forward only" minimal cycles corresponding to the Krebs cycle representation of FIG. 10.

FIG. 28 is a chart of a minimal cycle set corresponding to the Petri net representation of FIG. 27 as provided in accordance with the routine of FIGS. 8 and 9.

FIGS. 29 and 30 are charts listing occurrence of places and transitions, respectively, in the minimal cycle set of FIG. 28.

FIGS. 33 and 34 are charts that collectively depict a minimal cycle set corresponding to the Petri net representation of FIG. 32 as determined in accordance with the routine of FIGS. 8 and 9.

FIG. 35 is a diagrammatic view of certain two-cycles for the Petri net of FIG. 32.

DETAILED DESCRIPTION OF SELECTED EMBODIMENTS

Figure 1:
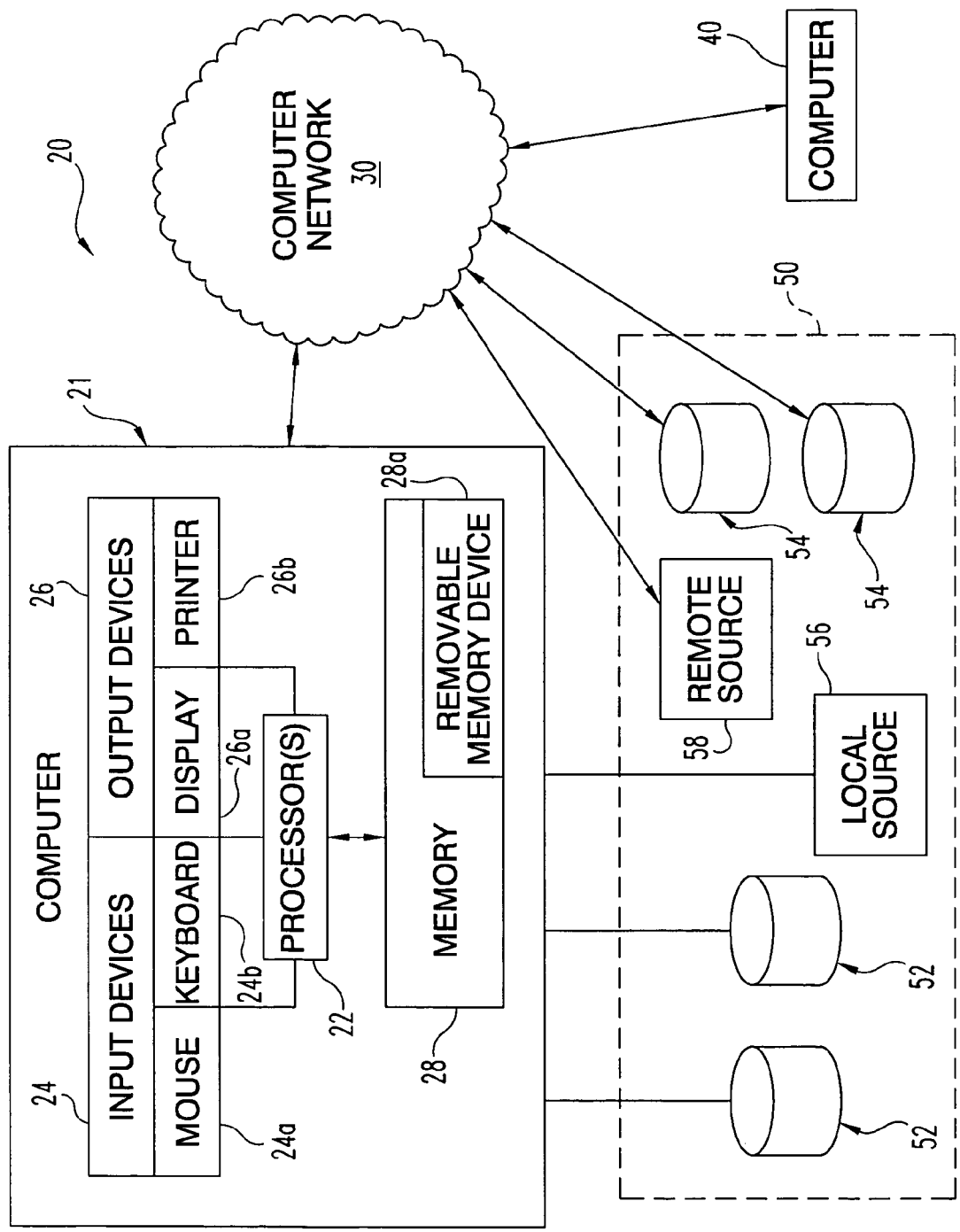
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 diagrammatically depicts computer system 20 of one embodiment of the present invention. System 20 includes computer 21 with processor 22. Processor 22 can be of any type, and is configured to operate in accordance with programming instructions, dedicated hardware, and/or another form of operating logic. In one embodiment, processor 22 is integrated circuit based, including one or more digital, solid-state central processing units each in the form of a microprocessor. Processor 22 can include one or more central processing units (CPUs) configured for operation in a parallel, pipeline, or other multiprocessing arrangement.

System 20 also includes operator input devices 24 and operator output devices 26 operatively coupled to processor 22. Input devices 24 include a conventional mouse 24*a* and keyboard 24*b*, and alternatively or additionally can include a trackball, light pen, voice recognition subsystem, and/or different input device type as would occur to those skilled in the art. Output devices 26 include a conventional graphic display 26*a*, such as a color or noncolor plasma, Cathode Ray Tube (CRT), or Liquid Crystal Display (LCD) type, and color or noncolor printer 26*b*. Alternatively or additionally output devices 26 can include an aural output system and/or different output device type as would occur to those skilled in the art. Further, in other embodiments, more or fewer operator input devices 24 or operator output devices 26 may be utilized.

System 20 also includes memory 28 operatively coupled to processor 22. Memory 28 can be of one or more types, such as solid-state electronic memory, magnetic memory, optical memory, or a combination of these. As illustrated in FIG. 1, memory 28 includes a removable/portable memory device 28*a* that can be an optical disk (such as a CD ROM or DVD); a magnetically encoded hard disk, floppy disk, tape, or cartridge; and/or a different form as would occur to those skilled in the art. In one embodiment, at least a portion of memory 28 is operable to store executable operating logic for processor 22 in the form of programming instructions. Alternatively or additionally, memory 28 can be arranged to store data other than programming instructions for processor 22. In still other embodiments, memory 28 and/or portable memory device 28*a* may not be present.

System 20 also includes computer network 30, which can be a Local Area Network (LAN); a Municipal Area Network (MAN); a Wide Area Network (WAN), such as the Internet; another type as would occur to those skilled in the art; or a combination of these. Network 30 couples computer 40 to computer 21; where computer 40 is remotely located relative to computer 21. Computer 40 can include a processor, input devices, output devices, and/or memory as described in connection with computer 21; however these features of computer 40 are not shown to preserve clarity. Computer 40 and computer 21 can be arranged as client and server, respectively, in relation to some or all of the data processing of the present invention. For this arrangement, it should be understood that many other remote computers 40 could be included as clients of computer 21, but are not shown to preserve clarity. In another embodiment, computer 21 and computer 40 can both be participating members of a distributed processing arrangement with one or more processors located at a different site relative to one or more others. The distributed processors of such an arrangement can be used collectively to execute routines according to the present invention. In still other embodiments, remote computer 40 may be absent.

Operating logic for processor 22 is arranged to facilitate performance of various routines, subroutines, procedures, stages, operations, and/or conditionals described hereinafter. This operating logic can be of a dedicated, hardwired variety and/or in the form of programming instructions (software and/or firmware) as is appropriate for the particular processor arrangement. Such logic can be at least partially encoded on device 28*a* for storage and/or transport to another computer. Alternatively or additionally, the logic of computer 21 can be in the form of one or more signals carried by a transmission medium, such as network 30.

System 20 is also depicted with computer-accessible data sources or datasets generally designated as corpora 50. Corpora 50 include datasets 52 local to computer 21 and remotely located datasets 54 accessible via network 30. Computer 21 is operable to process data selected from one or more of corpora 50. The one or more corpora 50 can be accessed with a data extraction routine executed by processor 22 to selectively extract information according to predefined criteria. In addition to datasets 52 and 54, data may be acquired from a datastream as represented by local datastream source 56 and/or remote datastream source 58, which may be live, realtime, or otherwise. The data mined in this manner can be processed with system 20 to provide one or more corresponding data processing outputs in accordance with the operating logic of processor 22.

Figure 2:
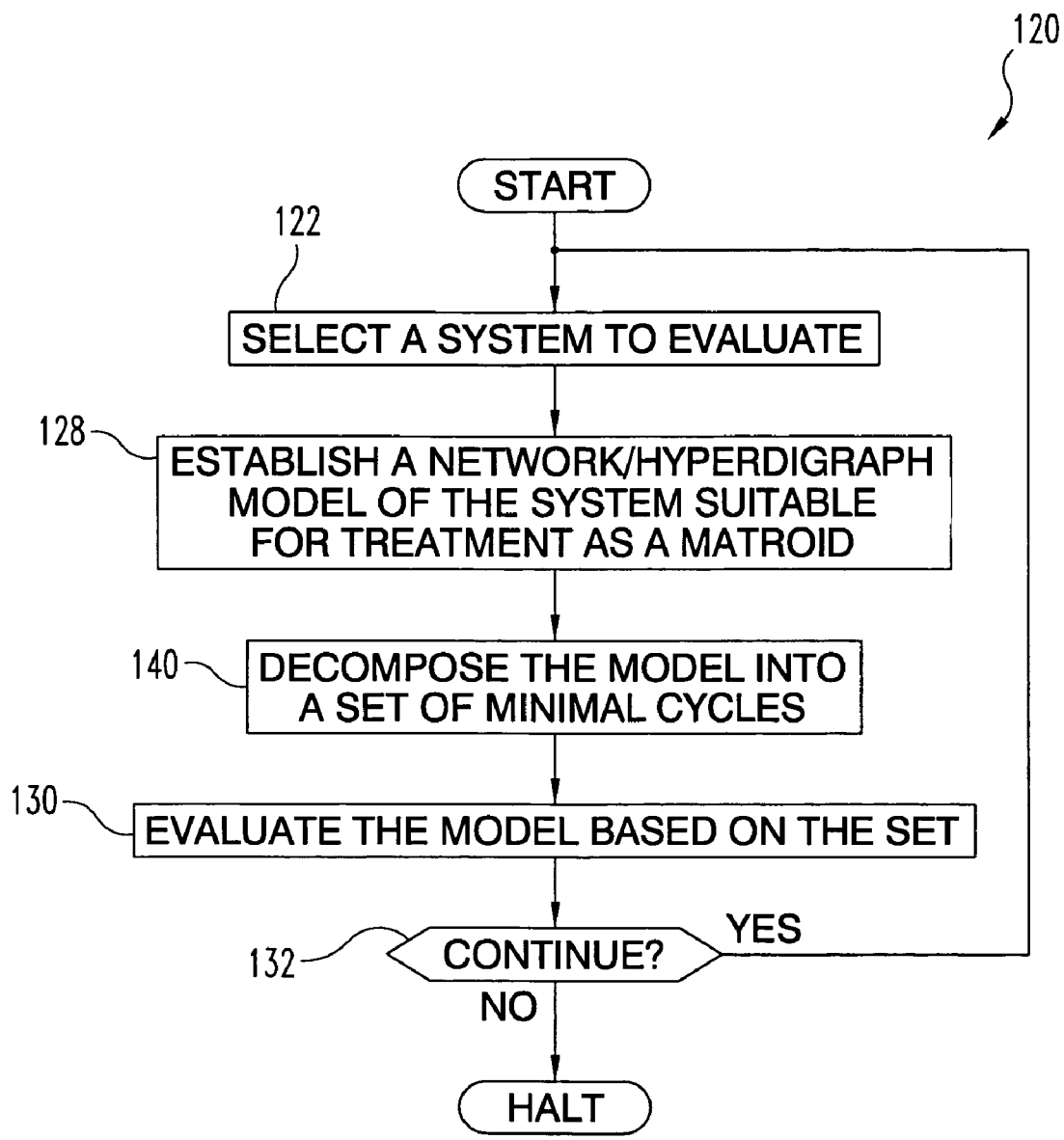
FIG. 2 is a flowchart illustrating a data processing procedure that can be executed with the system of FIG. 1.

FIG. 2 illustrates a flowchart of data processing procedure 120. Procedure 120 can be implemented in accordance with operating logic of system 20. Procedure 120 begins with operation 122. In operation 122, a physical system is selected for evaluation. Typically, the selected system is characterized by data from corpora 50, such a datasets 52 and/or 54 accessed directly/locally or indirectly/remotely through network 30. The system can be of any type, including but not limited to a biological process or reaction, such as the Krebs cycle; a communication system, such as a computer network, a telephone network, a collection of communicating individuals and/or devices; an arrangement of related signals of a homogenous or heterogenous type; a circuit of an electric, magnetic, optical, pneumatic, and/or hydraulic type; a manufacturing or assembly procedure/process; a meteorological model; and/or an economic model, just to name a few representative examples.

Procedure 120 continues with operation 128. In operation 128, the selected system is described in terms of a group of interconnected constituents or nodes with a form of network and/or graphic model. In one form, a Petri net representation is generated. This form is readily interchangeable with a hyperdigraph model, that is suitable for mathematical treatment as a matroid. By way of nonlimiting example, a biochemical reaction can be selected as a system in operation 122 subject to Petri net modeling in operation 128.

To better understand this approach, certain terminology is further described. A "directed graph" is a data structure that conveys connectivity and direction. It is composed of two sets: a vertex set and an edge set. Typically circles or "dots" represent vertices and arrows represent edges in a directed graph. A vertex contains a data element, and an edge specifies a rule and direction for the relationship between any two vertices. A "Petri net" is an extension of this notion in which edges (called "transitions") are allowed many input and output vertices (called "places"). In modeling a biochemical pathway with a Petri net, a "place" represents a chemical species, and a "transition" represents a chemical event. In this context, a "chemical event" refers to any interaction that converts one molecule into another, including intermediate or transitory processes, such as a complex formation. A chemical event could be a classical chemical reaction (e.g., condensation, phosphorylation), an enzymatic process (e.g., substrate binding, release of product), and/or various reactant and product interactions where the chemical nature of the interacting partners is not changed, (e.g., complex formation).

The Petri net model provides a corresponding set of combinatorial tools for deducing the qualitative control logic of biochemical networks. This approach defines states in the system to be marked places and associated tokens as circles with a "P" designator in Petri net illustrations herein. These places symbolically represent biomolecular species such as metabolites, enzymes, and cofactors, etc. The systematic nature of this modeling approach studies the circuit arrangements or partitions of a biochemical network as functions of the marked places (biochemical species), subject to a set of process control rules defined by the transition conditionals of the Petri net that appear as rectangles or squares between places and have the "t" 0 (transition) designator in associated Petri net illustrations. When a transition is executed, it has been "fired" and a set of transitions being fired is called a firing sequence.

Figure 3:
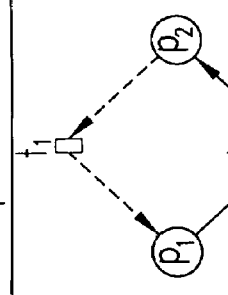

FIG. 3 depicts a table comparing different ways to represent molecular reaction and complex formation, in the second and third rows, respectively. The first row and first column provide labeling for FIG. 3. The second column designates a conventional chemical equation form, the third column provides a symbolic representation of the reaction, and the fourth column depicts a corresponding Petri net form. The phenomenological model of a kinetic reaction network can be defined in generality by a Petri net. Complex biochemical processes can be considered in terms of two types of biochemical building blocks: (1) molecular reaction and (2) complex formation, which are depicted in the second and third rows of FIG. 3, respectively. These building blocks can be considered as Petri net stencils. In the Petri net representations, forward paths are denoted by solid lines with directional arrows, and backward paths are denoted by dashed lines with directional arrows.

The topology of a Petri net is completely specified by its incidence matrix, whose rows are places and columns are transitions. The last column of FIG. 3 provides incidence matrices each corresponding to the Petri net representation of the same row. Each entry in the incidence matrix is a 0, 1, or −1. These quantities specify the absence or presence of a connecting edge between two places, as well as its direction. Circuits can be found by generating the incidence matrix. If information is flowing from a place to a transition, the corresponding matrix entry is −1, representing a loss. If the flow is from a transition to a place, the corresponding matrix entry is +1, representing a gain. The matrix entry is zero otherwise. Associated with a Petri net is a marking space. Markings can be considered as a vector of token counts representing information or measure of the state represented by the corresponding place P. A place producing the information is referred to as a source; and a place consuming the information is a sink. Flux conservation is achieved when the rate at which tokens are being produced equals the rate at which tokens are being consumed. When the flux for a given firing sequence starts and ends at the same point, it is called a circuit. These circuits can be of interest because they represent the paths by which the network is passing as well as conserving information.

Figures 4, 5:
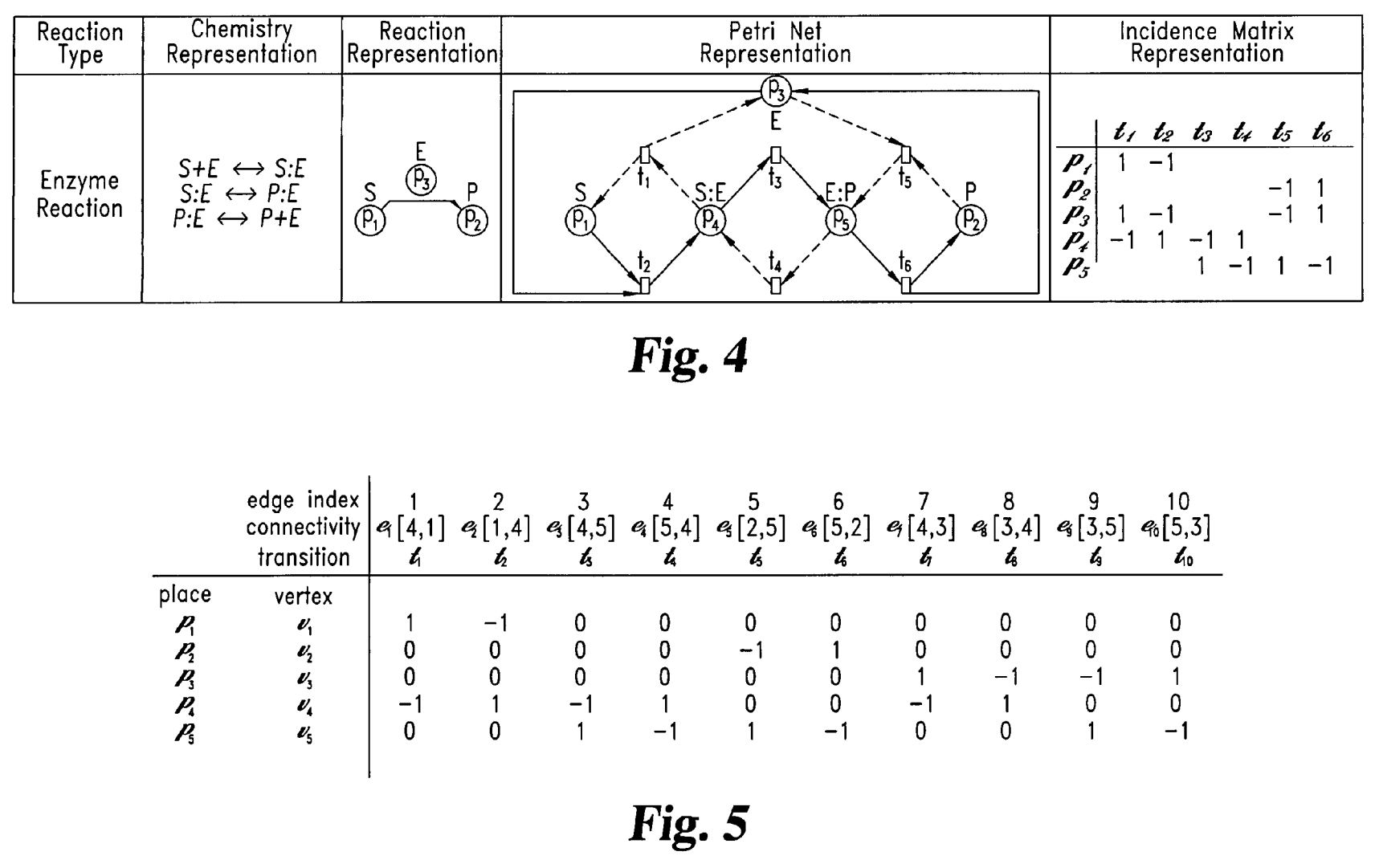

FIG. 4 provides a comparison between various ways of representing an enzyme reaction, including a Petri net model in the fourth column. As depicted in FIG. 4, an enzyme-catalyzed reaction is modeled as a series of separate stages as follows (not necessarily the actual physical process): (1) interaction of substrates, (2) association of the interacting substrates with the enzyme, (3) transformation of substrates to products by the enzyme, (4) dissociation of products from the enzyme, and (5) separation of the products from one another. This model focuses on accounting for each molecular species and its corresponding set of possible reactions. The biochemical reaction is viewed as an edge or subset of edges in a graph, depicting flow of information rather than detailed reaction mechanisms.

The Petri net representation in turn defines a hyperdigraph. For a hyperdigraph representation, the vertices represent the places P of the network and the edges represent the transitions t (rules or conditions that must be true before transitioning between places). As with all hypergraphs, Petri net edges may connect a set of vertices with cardinality greater than two. In order to identify the circuit decomposition of a general network as further described hereinafter, the hyperdigraph representation of the Petri net is transformed to satisfy the more general condition of being a graph. There are several ways to obtain a faithful graph representation of the hyperdigraph. For example, one can either transform the hyperdigraph into a directed bipartite graph or into an undirected graph while maintaining a record of the added edges, compressed multi-edges, and all of the directional information. The conversion of the hyperdigraph arises because there may be multiple inputs and/or outputs associated with the transitions that are more readily manipulated when in a true graph form.

The molecular reaction presented in the second row of FIG. 3 is a simple reversible reaction path that is referred to as a simple circuit in the network model and a two-cycle in the graph representation. The complex formation in the last row of FIG. 3 is a more complex example. As can be seen in the Petri net representation of complex formation, transition ti contains the rule combining the flow of information from places $P_1$ and $P_2$ to $P_3$; similarly, transition $t_2$ contains the rule splitting the flow of information from place $P_3$ into places $P_1$ and $P_2$. The representation assumes that all transitions are simply unary, where the regulation cannot be specified. To address these conditions, a graph is associated with a Petri net that has exactly the same cycles as the net has circuits.

Once the incidence matrix N is generated, the left nullspace of the matrix can be determined by finding solutions of $N^T v=0$, where n corresponds to the number of reacting species within the biochemical system (places), m corresponds to the number of reactions that are taking place (transitions), and v is the n-dimensional solution vector.

In addition to its topology or connectivity, a Petri net at a given time has a state or marking that is specified by the number of tokens (quantity of a molecular species) in each place. When a reaction or series of reactions takes place, the corresponding transitions are said to have fired, and the token numbers then change commensurate with the stoichiometry of the reaction. For example, if a firing sequence of the Petri net that describes the fumarase reaction fires once, there will subsequently be one less molecule of fumarate, one more molecule of L-malate, and the same number of molecules of fumarase. Table I depicts this process as follows:

TABLE I

| fumarate + fumarase ⟷ fumarate: | known as association, |
| fumarate:fumarase ⟷ L-malate:fumarase, | known as transformation, |
| L-malate:fumarase ⟷ L-malate + fumarase, | known as dissociation, and |
| Collectively: fumarase + fumarase ⟷ L-malate + fumarase. | |

Should the number of fumarate molecules be zero, this particular reaction will be unable to fire until some other reaction sequence replenishes this molecule. With the Petri net approach, the transformation of fumarate to L-malate can be modeled without detailed knowledge of how the process has occurred at the molecular level. Accordingly, uncertain parameter information can be effectively included in the network model if the connectivity is known.

Discrete approaches to modeling kinetics, such as the one under consideration can be desired when dealing with relatively small numbers of molecules relative to molar scales. Indeed, there are often only thousands to millions of a given protein molecule in a cell, which is far less than even pM quantities (10-12 moles=$6 \times 10^{11}$ molecules). Because chemical entities react in a unit fashion governed by the stoichiometry of the process (fractions of proteins do not react—only whole ones), integer-based modeling of protein reactions in a living cell is typically desired. Petri nets are generally an appropriate candidate for such modeling.

Consider one such example involving nonsimple reactions, the enzyme reaction presented in FIG. 4. The corresponding incidence matrix of the Petri net representation is also illustrated in FIG. 4. This incidence matrix yields an associated family of edge-sets with only six minimal elements corresponding to the three two-cycles: $\{t_1, t_2\}$, $\{t_3, t_4\}$, and $\{t_5, t_6\}$. The first and last of these two-cycles each give rise to two distinct cycles. A corresponding digraph for the enzyme reaction of FIG. 4 is presented in FIG. 6, with its corresponding incidence matrix being presented in FIG. 5. With the conversion of the Petri net of FIG. 4 to the digraph of FIG. 6, notation changes slightly, in that places of the Petri net become vertices "v" of the digraph and transitions of the Petri net become edges "e" of the digraph. For example, the transition of $P_4 \to t_3 \to P_5$ is denoted by edge $e_{10}$. Accordingly, the digraph of FIG. 6 distinguishes between multiple paths passing through a single transition, such that the communication of information through transition $t_1$ is now split such that $P_4 \to t_1 \to P_5$ becomes $e_2$ and $P_4 \to t_1 \to P_1$ becomes $e_7$. The complete list of correspondences between transitions and digraph edges is provided in FIG. 5. The basis size was determined to be six. The seven unique minimal cycles or paths are presented in FIG. 7.

Figure 6:
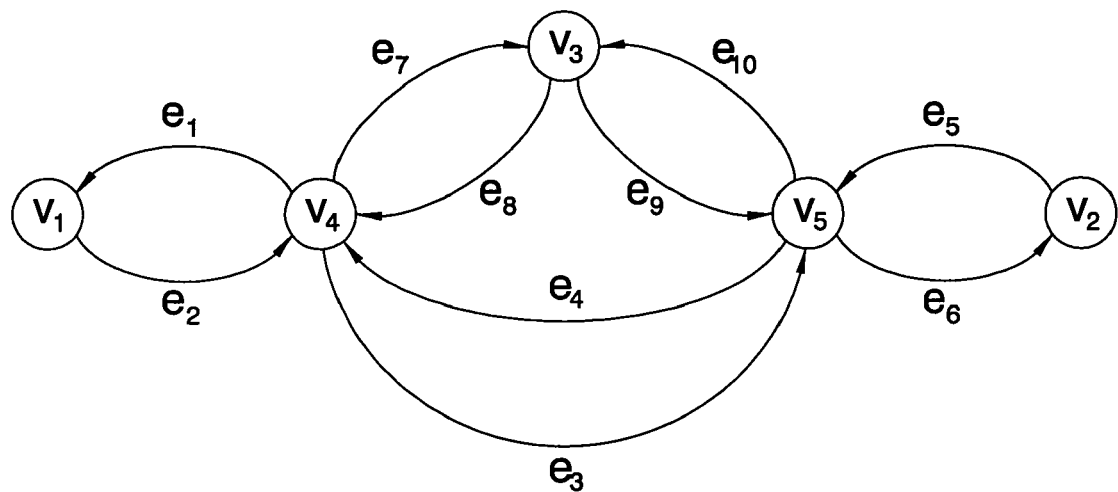
FIG. 6 is a view of a graph corresponding to the Petri net representation of FIG. 4 and incidence matrix of FIG. 5.
Figure 7:
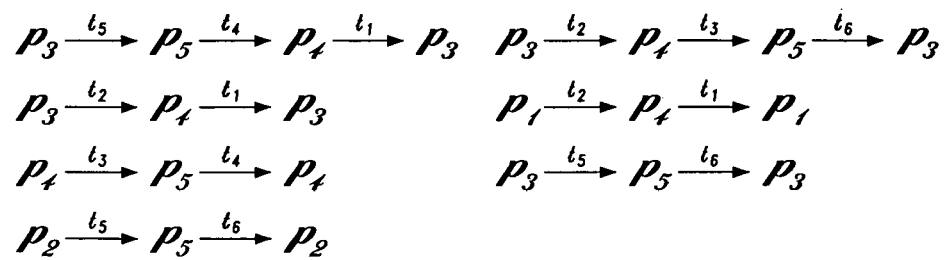
FIG. 7 is a diagrammatic view of a minimal cycle set corresponding to the Petri net of FIG. 4 and incidence matrix of FIG. 5.
Figure 8:
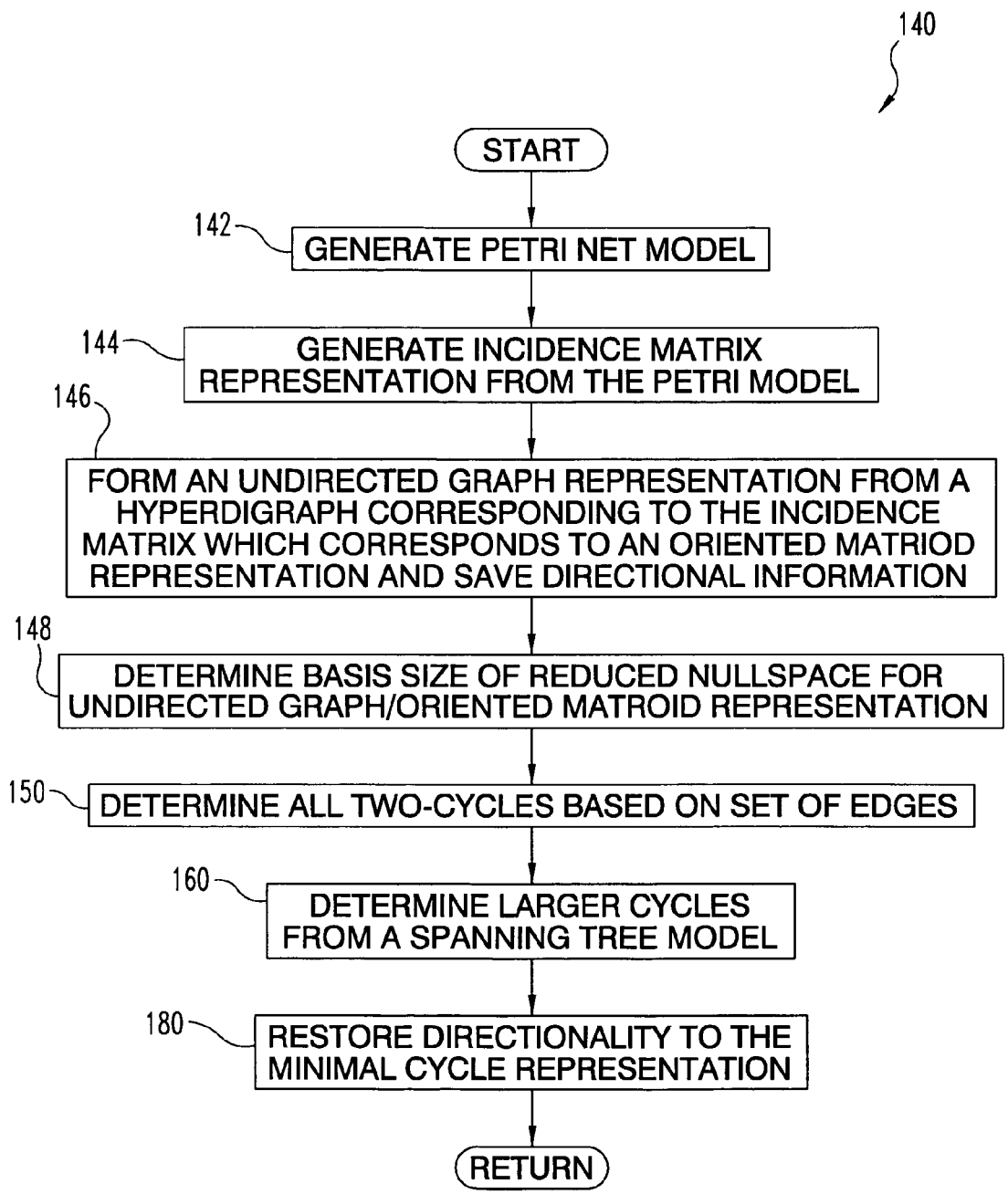
FIGS. 8 and 9 are flowcharts illustrating a routine for determining a minimal cycle set based on a matroid representation.
Figure 9:
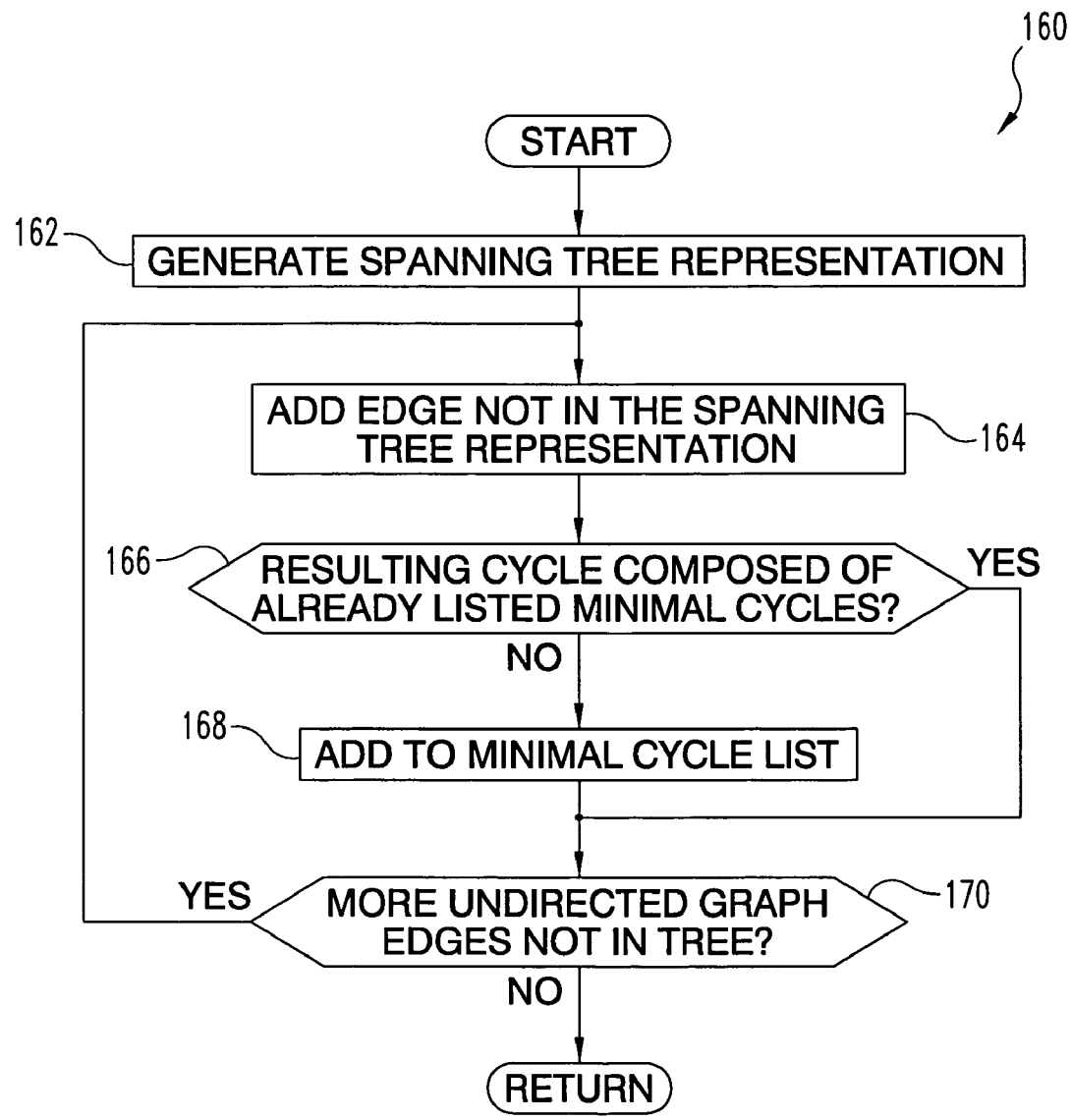

While this cycle decomposition can be determined by inspection from the graph of FIG. 6, in more complicated representations, a more systematic routine is envisioned. Returning to FIG. 2, procedure 120 advances from operation 128 to routine 140. Routine 140 provides an algorithm for decomposing the Petri net/hyperdigraph representation into a minimal set of fundamental circuits or cycles. FIGS. 8 and 9 illustrate routine 140 in greater detail in flowchart form. Routine 140 starts with the generation of a graphic data structure that corresponds to a Petri net or comparable model in operation 142. A hyperdigraph representation is prepared from the Petri net or alternatively could be directly used as an initial model. From the hyperdigraph representation, a multigraph representation, such as the digraph of FIG. 6 is prepared. This transformation results in the same number of graph vertices as places; however, edges are added in order to differential multiple paths through a given transition. Routine 140 proceeds from operation 142 to operation 144. In operation 144, the corresponding incidence matrix is generated. The creation of the matrix depicted in FIG. 5 for the FIG. 6 digraph corresponds to execution of operation 144.

Routine 140 continues with operation 146 in which the directed graph representation is transformed into an undirected graph and a corresponding incidence matrix is established, that corresponds to an oriented matroid. In converting to an undirected graph, edges are condensed by removing repeated edges and direction information is stripped. This edge and directional information is preserved as needed to reconstitute desired information regarding the initial model from which it is generated. It should be appreciated that there exists a bijective correspondence between the set of edges for this undirected graph and the set of obtainable two cycles of the initial model (Petri net/hyperdigraph), and that the undirected graph has cycles in one-to-one correspondence with the circuits of the directed bipartite graph representation of the Petri net. Based on this property, the cycles of an undirected graph form a $Z_2$-vector space, which is the nullspace of the corresponding incidence matrix, considered as a $Z_2$-matrix.

From operation 146, operation 148 is performed with the undirected graph. The vector space of cycles for the undirected graph has dimension (m−n+1) where m is the number of edges of the transformed matrix, and n the number of vertices. Hence the space has size $2^{(m-n+1)}$. In operation 148, the basis size for this vector size of the nullspace is determined. This basis size may be found from a spanning tree for the graph. Continuing with operation 150, all two-cycles are determined, given that there exists a bijective correspondence between the set of edges in the undirected graph and the set of obtainable two-cycles.

Routine 140 continues with subroutine 160 that is more specifically described in flowchart form in FIG. 9. Subroutine 160 is directed to identifying any minimal cycles that include more than two vertices, such as three-cycles, four-cycles, etc. through application of a corresponding spanning tree. A "tree" is a mathematical structure that can be viewed as either a graph or as a data structure. The two views are equivalent, because a tree data structure contains not only a set of elements, but also connections between elements, giving a tree graph. A "tree graph" is a set of straight line segments connected at their ends containing no closed loops (cycles). In other words, it is a simple, undirected, connected, acyclic graph. A tree with n nodes has n-1 edges. Conversely, a connected graph with n nodes and n-1 edges is a tree. All trees are considered bipartite graphs. A "spanning tree" of a graph is a subset of n-1 edges that form a tree. The number of nonidentical spanning trees of a graph "G" is equal to any cofactor of the degree matrix of "G" minus the adjacency matrix of "G," which is known as the matrix tree theorem. A tree contains a unique spanning tree, a cycle graph $C_n$ contains n spanning trees.

Subroutine 160 begins with generation of a spanning tree representation for the graph in operation 162. Given the property that a fundamental cycle is one having only one edge not contained in the spanning tree, then the addition of any edge to this tree, which has no cycles initially, creates exactly one cycle. As a result, fundamental cycles have a one-to-one correspondence with the edges adjoined to the spanning tree.

Consequently, in operation 164, an edge is added from the graph that is not in the spanning tree representation. From operation 164, subroutine 160 continues with conditional 166. Conditional 166 tests if the cycle resulting from the addition of the edge in operation 162 is already contained in a listing of minimal cycles. This test includes determining whether the subject cycle can be composed from any smaller cycles of the listing, and only keeping those that cannot be composed from other smaller cycles of the list. This approach may result in redundantly listing one or more minimal cycles, which can be readily removed. If the test of conditional 166 is true (affirmative), subroutine 160 continues with operation 168. In operation 168, the subject cycle is listed. It should be appreciated that each minimal cycle corresponds to a null vector of the incidence matrix of the transformed graph. There is an empty cycle in the undirected graph and two empty cycles in the directed graph (digraph), that are ignored. Further, the reversibility assumption simplifies this process considerably, such that every undirected cycle gives rise to exactly two positive cycles-one in each direction.

Subroutine 160 continues from operation 168 with conditional 170. If the test of conditional 166 is false (negative), then subroutine 160 bypasses operation 168, and proceeds directly to conditional 170. Conditional 170 tests whether there are any more edges of the undirected graph to be evaluated with the spanning tree. If the test of conditional 170 is true (affirmative), subroutine 160 returns to operation 164 to evaluated the next edge. If the test of conditional 170 if false (negative), subroutine 160 returns to routine 140 of FIG. 8. Routine 140 proceeds from subroutine 160 to operation 180 to restore directionality and edge information as desired to the minimal cycle representation (listing) that results from subroutine 160. Routine 140 then returns.

Applying routine 140 to a more general case, the Krebs cycle has been evaluated. The tricarboxylic acid (TCA) or Krebs cycle is a series of biochemical reactions central to energy production in all eukaryotic cells. Substrates for the cycle include the products of glycolysis, protein, and lipid catabolism. Products of the TCA cycle are nucleotide reducing equivalents whose entry into the electron transport chain allows complete oxidation of molecules with concomitant production of adenosine triphosphate (ATP), the major energy molecule of the cell. In some instances not all small molecular species such as inorganic phosphate, carbon dioxide, and water are included in the model that follows, because they are not likely to have limiting concentrations in a living cell; however, the modeling approach does not preclude addition of such species in an alternative embodiment.

The Krebs cycle is the second stage in glucose oxidation. The Krebs cycle takes the products of glycolysis, which are pyruvates, and converts two of the carbons in pyruvate to $CO_2$ and also transfers electrons to electron carriers. As part of this process, three molecules of nicotinamide adenine dinucleotide (oxidized form) (NAD) (where NAD is NAD+) are reduced to nicotinamide adenine dinucleotide H (reduced form) (NADH), and one molecule of flavin adenine dinucleotide (oxidized form) (FAD) is converted to flavin adenine dinucleotide $H_2$ (reduced form) ($FADH_2$).

Fifty-nine places and 86 transitions were utilized to specify the Krebs cycle in a Petri net representation that was simplified by not tracking the number of water molecules nor the $CO_2$ released. From an operational control systems theory point of view, the transitions act as the control laws for the system whereas the places act as the place variables in the Petri net representation. The Petri net representation is a combinatorial abstraction of the molecular interactions defined over a chemical reaction space where the transitions define the operational conditions or roles that must be satisfied for a reaction to occur. In this graphical representation, a chemical species moves from one place to another subject to a transition rule based on chemical equilibria (thermodynamics) or kinetics. The chemical species do not pass formally through the transition but rather are subject to the rules described by the transition. In the Petri net model, two place nodes are connected subject to a transition node if it is possible for the second place to be reached from the first place through some physical/chemical mechanism which is reversible. Of course, the actual amount of chemical system reversibility may be very small and is dependent on the equilibrium constant and/or kinetic rate constants. Because all of the reactions under consideration are potentially reversible, these paired sets of transitions are identified explicitly. While not included in the described embodiment, in alternative embodiments, weights or probabilities can be assigned to the paths of the reactions, varying quantities of molecular species present can be established, the equilibrium constants and/or reaction rates made variable, and/or the timed sequence of various events could be varied.

Figure 10:
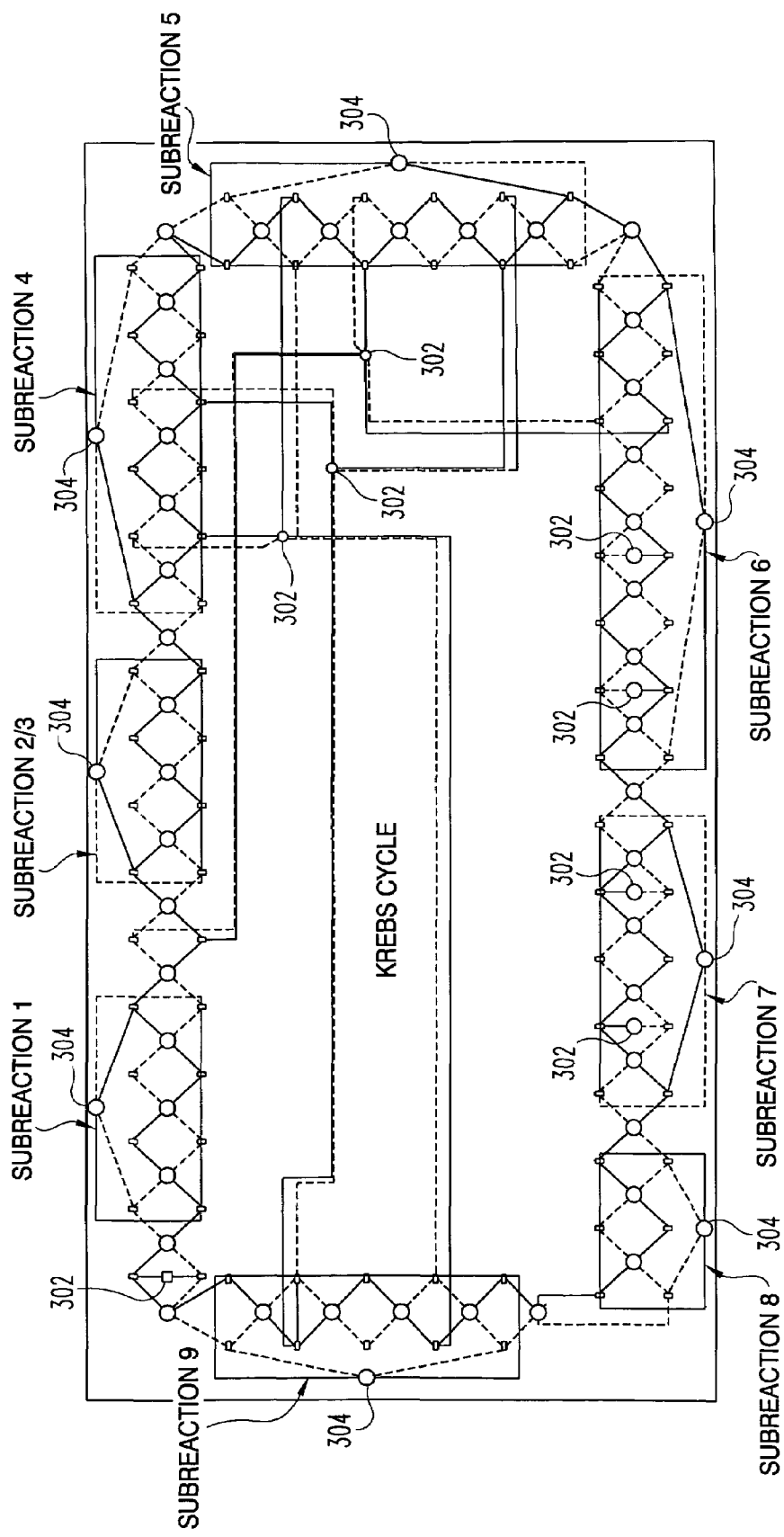
FIG. 10 is a Petri net representation of the Krebs cycle processed in accordance with the procedure of FIG. 2.

The overall Petri net representation 300 is schematically depicted in block form in FIG. 10. Subreactions 1, 2/3, 4, 5, 6, 7, 8, and 9 are illustrated in FIGS. 12-19, respectively. Subreaction 1 involves places $P_{58}$-$P_8$ and transitions $t_1$-$t_{12}$; subreaction 2/3 involves places $P_8$-$P_{13}$ and transitions $t_{13}$-$t_{20}$; subreaction 4 involves places $P_{13}$-$P_{20}$ and transitions $t_{21}$-$t_{32}$; subreaction 5 involves places $P_{20}$-$P_{27}$ and transitions $t_{33}$-$t_{44}$;

subreaction 6 involves places $P_{27}$-$P_{38}$ and transitions $t_{45}$-$t_{60}$; subreaction 7 involves places $P_{38}$-$P_{46}$ and places $t_{61}$-$t_{70}$; subreaction 8 involves places $P_{48}$-$P_{50}$ and transitions $t_{71}$-$t_{76}$; and subreaction 9 involves places $P_{50}$-$P_{58}$ and transitions $t_{77}$-$t_{86}$. It should be appreciated that FIG. 10 lacks specific place and transition designations due to preserve clarity. Forward paths are designated by directed solid lines and backward paths are designated by directed dashed lines. Forward and backward paths are given equal weight in terms of describing the possible paths along which information can flow. In the Petri net representations, connections are indicated regardless of whether that communication of information is via a forward or a backward path or combination thereof.

In our representation 300, the Krebs cycle is described by 59 places, one for each species in the cycle. The list of places is specified in FIG. 11. The places highlighted in bold are those later identified by the mathematical model to be of special interest. The places represent the various key chemical species, other than H+, $H_2O$, and $CO_2$, produced or consumed in the Krebs cycle.

In the Petri net representation 300 of the Krebs cycle presented in FIG. 10, nucleotide cofactor places are further designated by reference numeral 302 and the enzyme places are further designated by reference numeral 304. FIGS. 12-19 depict certain details of representation 300 not shown at the scale of FIG. 10 for the sake of clarity. Nonetheless, the cross-couplings involving places P57 or NADH, P58 or NAD, and P59 or coenzyme A [CoA] are specifically indicated in FIG. 10. These nucleotide cofactors are involved in interactions between the subreactions which provide alternative pathways through the Krebs cycle.

Having established Petri net 300, the incidence matrix is then constructed. Because the incidence matrix is relatively large, only a representative portion corresponding to its upper left quadrant is presented in FIG. 20. It should be understood that there are certain interesting features regarding the nucleotide cofactors: P57 (NADH), P58 (NAD), and P59 (CoA). For example, all of the forward paths go into P57 (from subreactions 4, 5, and 9) and all of its backward paths leave from P57 (10 other species within subreactions 4, 5, and 9). Conversely, all of the forward paths lead from P58 (from subreactions 4, 5, and 9) and all of its backward paths lead into P58 (again, interaction with other species within subreactions 4, 5, and 9). P59 is different because CoA has forward paths leading into it from subreactions 1 and 6, and its third forward path leads from CoA into Subreaction 5. CoA has backward paths to subreactions 1 and 6 and from subreaction 5. The evaluation of representation 300 includes performing routine 140 of FIGS. 8 and 9, as previously described, to determine a set of minimal cycles. Within the minimal cycle set, places and transitions that appear most and least often are considered and may then be examined in terms of their biochemical importance.

Next subreactions as detailed in FIGS. 12-19 are further considered. As depicted in FIG. 12, subreaction 1 is connected to subreaction 9 via a forward path and from subreaction 9 via a backward path. The citrate in Subreaction 1 is connected to, or may even be considered a part of, the combined subreactions 2/3 via a forward path and from subreactions 2/3 via a backward path. The citrate:CoA complex is connected to CoA, which in turn is connected to subreaction 5 in a forward path (and from a backward path) and to subreaction 6 in a backward path (and from a forward path). Note that CoA is included as a complex formation, similar to acetyl CoA. It is not drawn the same way because CoA is shared and appears in the network in several other subreactions. It should be appreciated that subreactions 2 and 3 were combined because the aconitase enzyme catalyzes two consecutive Krebs cycle reactions.

Figure 14:
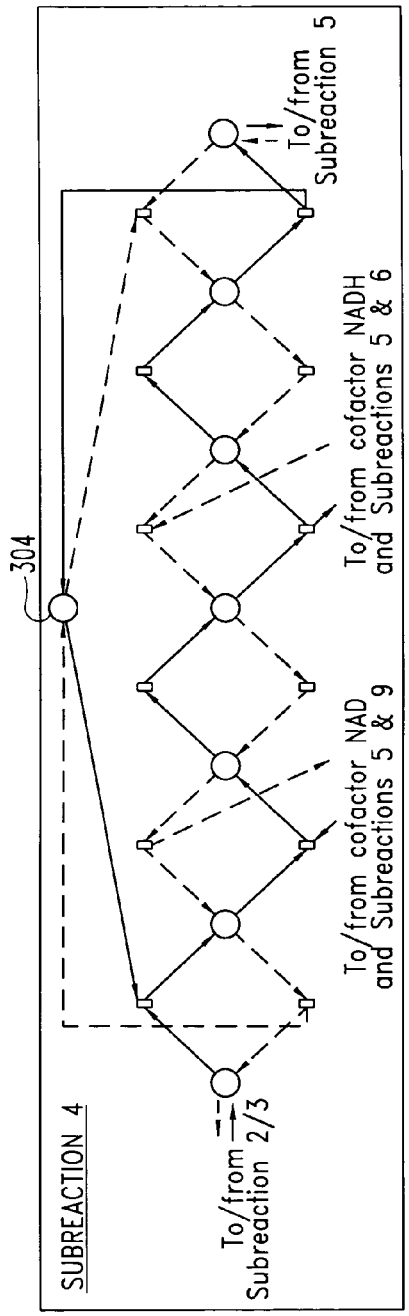
Figures 15, 19:
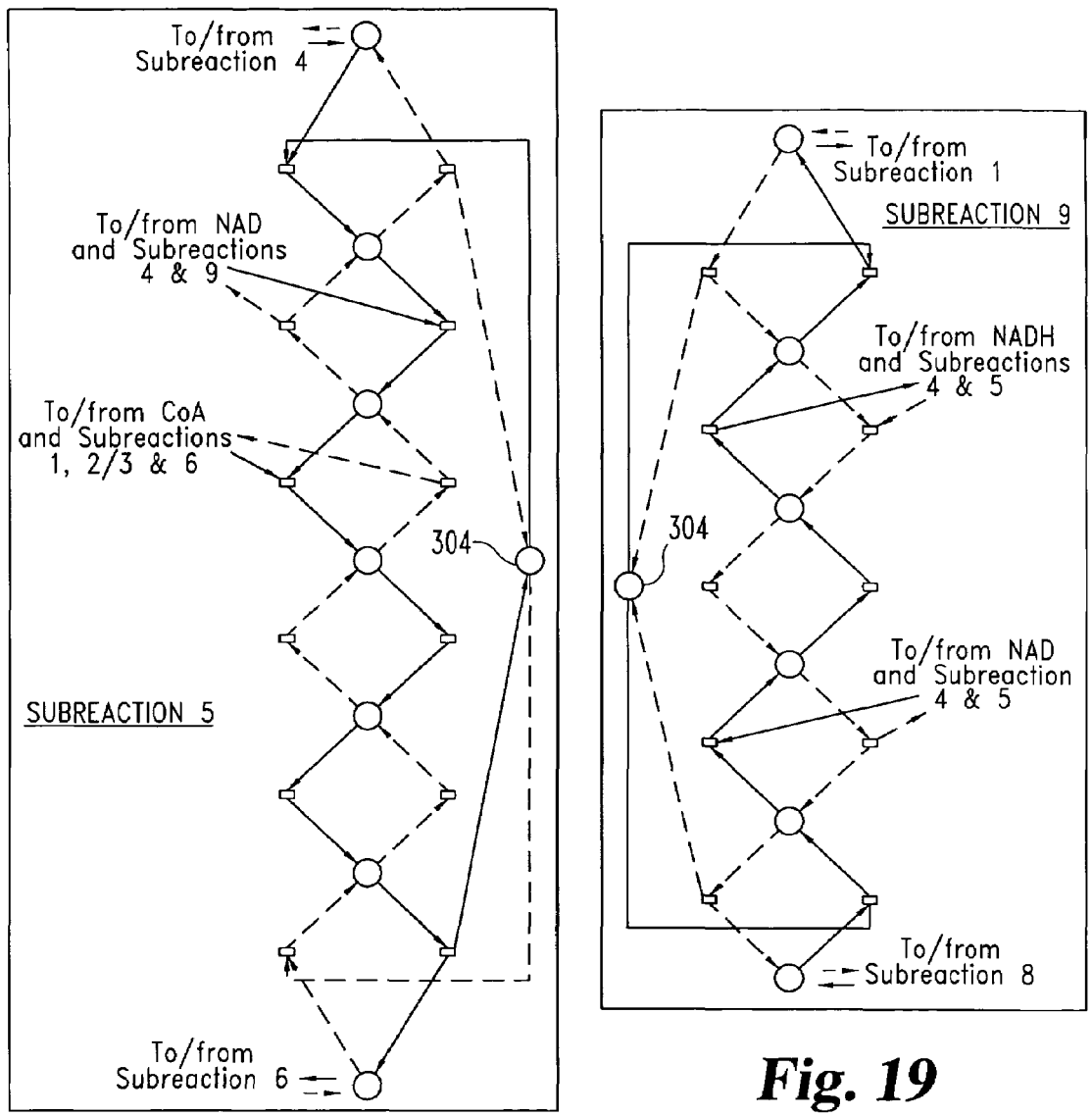

Subreactions 2/3 is depicted in FIG. 13, and are connected to the citrate of subreaction 1 via a backward path and from the same citrate via a forward path. The isocitrate of subreactions 2/3 is also a species of subreaction 4. Subreaction 4, as depicted in FIG. 14, shares isocitrate with subreactions 2/3. It also shares α-ketoglutarate with subreaction 5. Further complexity and system versatility is provided in subreaction 4 from its communication via cofactors NAD and NADH. Subreaction 5, as depicted in FIG. 15, is further described later in the text due to its orientation when extracted from FIG. 12. It should be appreciated that subreaction 5 shares α-ketoglutarate with subreaction 4 and it shares succinyl CoA with subreaction 6. Further, it couples to both subreaction 1 and the combined subreactions 2/3 and to subreaction 6 through P59 (CoA). It also couples to subreactions 4 and 9 through both NAD and NADH.

Figure 16:
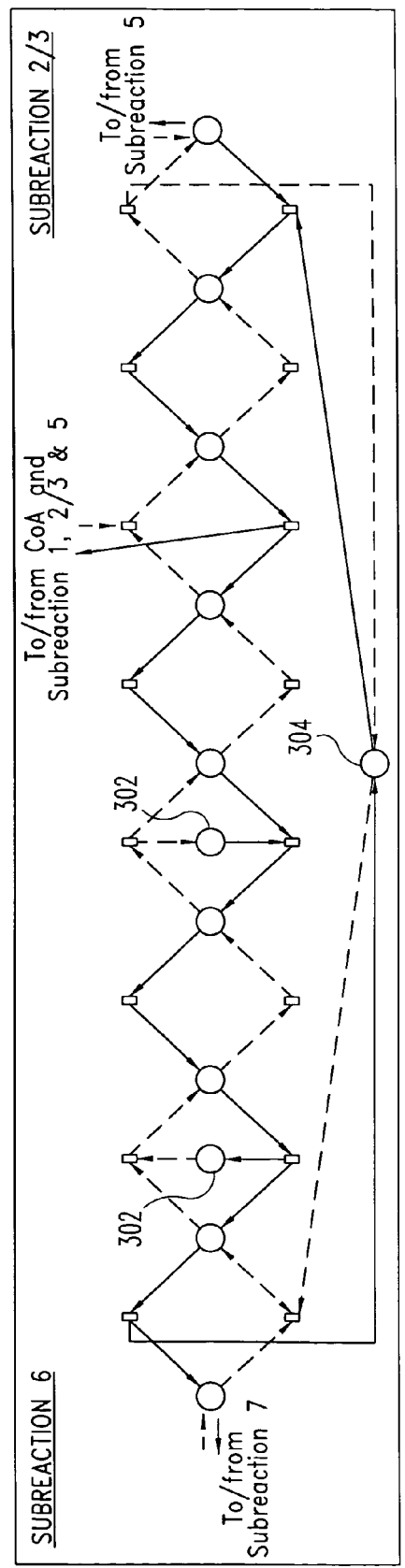
Figure 17:
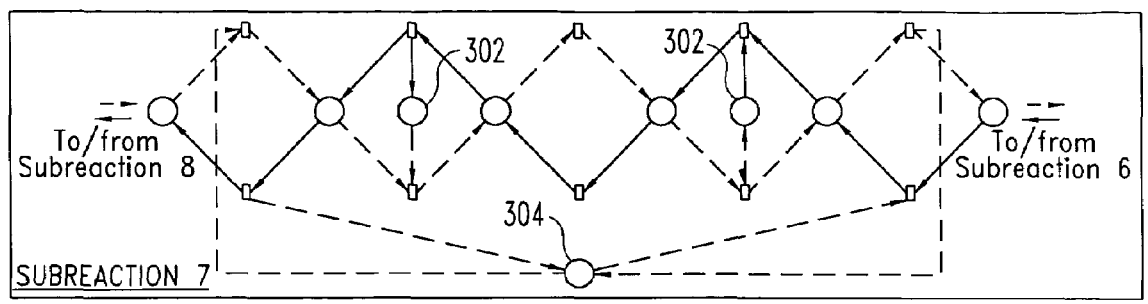
Figure 18:
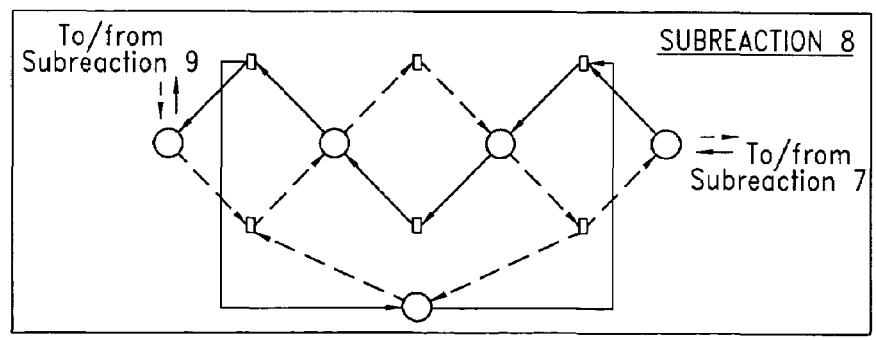

Subreaction 6, as depicted in FIG. 16, involves nucleotide cofactors guanosine diphosphate (GDP) and guanosine triphosphate (GTP). It shares succinyl CoA with subreaction 5 and succinate with subreaction 7. Communications through cofactor CoA have previously been described. Subreaction 7, as depicted in FIG. 17, involves nucleotide cofactors FAD and FADH. It shares succinate with subreaction 6 and fumarate with subreaction 8. Subreaction 8, as depicted in FIG. 18, shares fumarate with subreaction 7 and L-malate with subreaction 9. As depicted in FIG. 19, subreaction 9 completes the cycles with its sharing of oxaloacetate with subreaction 1. Its cross-couplings have previously been described. Accordingly, representation 300 corresponds to an extensive collection of circuits via forward and backward paths. Some admissible paths, however physically improbable, are more readily identified through this form of evaluation as compared to alternative methods of Krebs cycle analysis, and yet such paths may prove to be of interest from a biochemical and/or pharmaceutical point of view.

Figure 20:
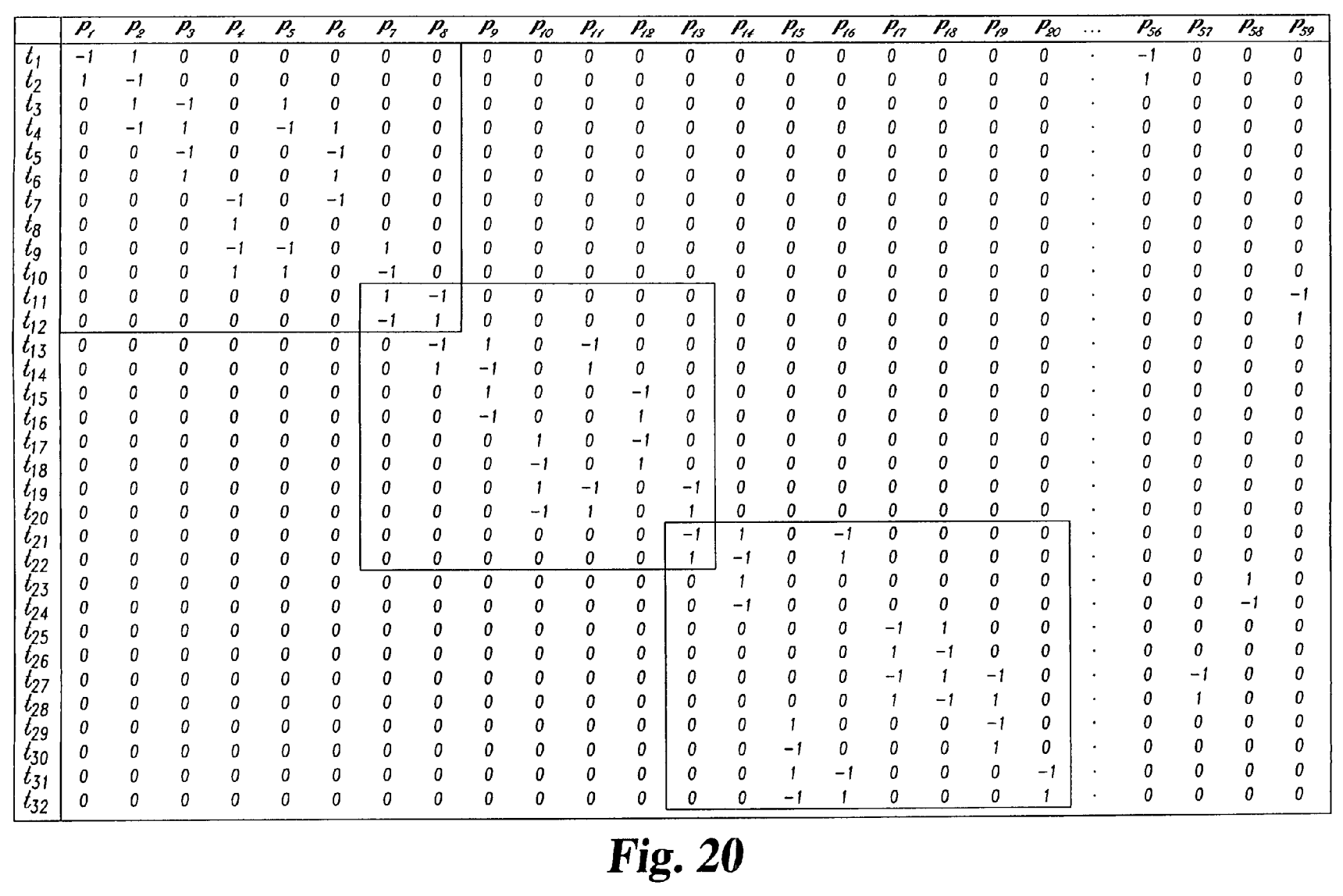

As previously indicated, FIG. 20 depicts a portion of the incidence matrix corresponding to representation 300. Specifically the matrix portion of FIG. 20 depicts entries for subreactions 1, 2/3 and 4. It should be appreciated that this depiction reveals a nearly block-banded matrix structure—the overlapping of the blocks being associated with adjacent subreactions—and the cross-couplings accomplished by the places P57, P58 and P59. Routine 140 was executed in software form using the representation 300 information to identify 73 two-cycles, while suppressing multiple edges. These same two-cycles can be recognized as all of the molecular reactions in the Krebs cycle representation 300, noting that each complex formation contains two two-cycles and each enzymatic reaction contains five two-cycles. The two-cycles may be counted by traversing the Krebs cycle backbone starting and ending at P56, which identities 43 two-cycles, and then adding an additional two-cycle for each of the 14 complex formations, and two additional two-cycles for each of the 8 enzyme reactions, for the total of 73.

The software of routine 140 next determined that the basis size is 15, which indicates that there are $(2^{15}-1)$ possible minimal cycles through the undirected graph or $(2^{15+1}-2)$ possible minimal cycles through the transformed directed fundamental network graph; where there is a single empty cycle (i.e., with no edges) in the undirected graph and two empty cycles in the directed graph that are not counted by the software. Theoretically, all of the closed circuits achievable in this network can be composed from the minimal set of circuits; however, the direct size of the directed characterizing data set is considerably smaller than the 216 theoretical value. The software used for routine 140 includes a script that is executed to identify the set of unique minimal cycles by removing the duplicates. As a result, there are 73 two-cycles and 15,820 other cycles and the 1 zero-cycle, for a total of 15,894 unique minimal cycles. This complete listing of cycles is then stored in a database for further analysis. The total number of unique minimal cycles is a factor of four less than the theoretical number due to the removal of nonminimal cycles. All 15,893 unique minimal circuits, corresponding to the 15,893 nonzero cycles, with their label information characterize the Krebs cycle network.

This collection of unique minimal pathways is the complete listing of closed walks that traverse the network from beginning to end. The unique minimal pathways are the shortest, nonrepeating, nonlooping, nonrevisited paths. Once the data set of circuits that decompose this network as a set of minimal cycles of the graph has been identified, routine 140 of FIGS. 8 and 9 is complete. With the completion of routine 140, procedure 120 continues with operation 130 as depicted in FIG. 2. In operation 130, the model is evaluated based on the minimal cycle set. In one arrangement, this minimal set of fundamental cycles is stored in a database defined by memory 28 and/or corpora 50 of system 20.

Any number of search strategies may be specified as linear objective functions over this set of minimal cycles. Under appropriate circumstances, the creation of such network models for biochemical systems enables the elucidation and quantification of the system response to a perturbation. The technique of routine 140 generates a listing of all of the minimal circuits that principally compose the representative network—such that the network is decomposed to its fundamental constituents or circuits. Given the complete listing of unique minimal circuits, evaluations can be formulated regarding the characteristics of the flow of information in the network representation in the presence or absence of unknown and/or deleted biochemical species. Generally, graphic network models can provide a computational framework for identifying key circuits, and, subsequently, potential oscillatory behaviors and system responses to biochemical perturbation. This model can correspondingly represent the set of all mass-flux balance-conserving pathways or circuits for a given biochemical reaction sequence. The size and complexity of the problem of identifying all such allowable paths and combinations of paths can pose appreciable computational complexity for large systems.

With the addition of edge weights and markings to the hyperdigraph representation, the network can be analyzed to identify the set of paths which are of particular biochemical interest via optimization methods using path algebras or linear programming/oriented matroid programming. Analysis of this data, includes looking for biochemically meaningful information by identifying the transitions or places appearing most often or least often in the set of unique minimal cycles. Other questions that can be answered by postprocessing of this data set involve the identification of alternate pathways through the Krebs cycle. For example, if a place or transition in the Krebs cycle is disabled, what alternate pathways remain. The alternative pathways can be identified by inspecting the complete listing of circuits, eliminating those circuits containing the disabled place or transition. Frequency distributions are presented indicating the number of occurrences of each transition or place in the list of unique minimal cycles. Extreme values in the network analysis are of interest, be they valleys (i.e., infrequent occurrences) or peaks (i.e., frequent occurrence).

There are 86 transitions required to specify the Krebs cycle. The transitions, the count of their occurrences in the 15,893 unique minimal cycles, and the percentage of their occurrences in the 15,893 unique minimal cycles are presented in FIG. 21. Transitions are listed in order of decreasing occurrence in FIG. 21. The transition occurrences have been listed in pairs; however, for analyses in which a near equilibrium assumption will not be made, the values may differ. A low percentage of transitions indicates that information does not pass as readily in these parts of the Krebs cycle and a high percentage indicates that these transitions are more readily passing information. The first set of low transition values (t5-t8) corresponds to passing through the citrate synthetase P5. The next set (t15-t18) corresponds to aconitase (P11) reactions. The next set of low values occur in subreaction 4 (t25, t26, t29, and t30) corresponding to isocitrate dehydrogenase (P16) complex formation. These low values are split by large transitions coupling to NAD/NADH$_2$. Low values are also found at t39 and t40, involving a-ketoglutarate dehydrogenase (P23) as well as with succinyl CoA (P27) synthetase. There are a large number of low percentage transitions (t47, t48, and t51-t58) in the CoA synthetase pathway, including the GDP→GTP reaction. Another group of low percentage transitions (t63-t68) is found for succinate dehydrogenase (P41) and the formation of FADH$_2$ (P45) from FAD (P43). Low percentage transitions, (t73 and t74) and (t81 and t82), are found for fumarase (P49) and for malate dehydrogenase (PS3), respectively. The low percentage transitions (<30%) are, in general, found in the centers of the various subreactions and involve enzyme-substrate complex formation.

There are fewer high percentage transitions (>60%) than low percentage transitions (<30%). The high percentage transitions involve the transitions in and out (t59-t62) from succinate (P38), in and out (t69-t72) from fumarate (P46), and in and out (t75-t78) of L-malate (P50). Whereas the lowest numbers of transitions correspond to enzyme complex formation, the highest numbers correspond to the release and use of the 4 carbon systems: succinate, fumarate, and malate. These involve substitutions of OH for H on succinate. The reaction involving the next step, includes the formation of a carbonyl from the alcohol to form oxaloacetate.

Fifty-nine places are utilized in representation 300 of the Krebs cycle. The places, the count of their occurrences in the 15,893 minimal cycles, and the percentage of their occurrences in the 15,893 unique minimal cycles are presented in FIG. 22. The table is presented in descending order of occurrence. The occurrence of places approximately splits into three categories: those between 65% and 92%, those between 33% and 54%, and those that only appear in one cycle. The latter grouping contains the enzymes: P5, P11, P16, P23, P30, P41, P49, and P53.

There are a number of places that have a high percentage of occurrences. The highest percentage is that associated with P51, which is the L-malate:malate dehydrogenase complex, followed by P29 and P7, which are the succinate:succinyl CoA synthetase complex and the citrate:CoA complex, respectively. The next highest percentages involve succinate and more of its complexes, and fumarate and its complexes. These are consistent with the fact that the most transitions involve these species. An interesting place which shows up at a high percentage is the isocitrate:isocitrate dehydrogenase place, P14.

An interesting species is the product CoA, P59. This product species occurs in 69% of the cycles. In addition, the nucleotide cofactor pair, NAD/NADH (P58/P57), which is involved in a number of enzyme complexes, occurs in almost 75% of the cycles, in contrast to the GDP/GTP (P34/P37) and FAD/FADH$_2$ (P42/P45) pairs, which occur in only one. This result is not surprising as NAD is reduced to NADH three separate times in the Krebs cycle. Thus, species that are produced multiple times have a much higher probability of being in a cycle. It can be speculated that the cycle originally just produced NADH, but over time, additional energetic species were utilized, FADH$_2$ and GTP, by small modifications of the cycle. The fact that GDP/GTP and FAD/FADH$_2$ appear so infrequently, as compared to the appearance of NAD/NADH in most cycles, is consistent with this conjecture. The cross-coupling nucleotide cofactors-places P57 or nicotinamide adenine dinucleotide H (NADH), P58 or nicotinamide adenine dinucleotide (oxidized form) (NAD), and P59 or coenzyme A (CoA) occur quite frequently at between 70% and 74%.

There is a large separation between the places that occur least frequently, in fact only once in the listing of unique minimal cycles, and the remaining places. These five species act as controllers in the Krebs cycle: P1 (acetyl CoA), P34 (guanosine diphosphate (GDP)), P37 guanosine triphosphate (GTP), P42 (flavin adenine dinucleotide (oxidized form) (FAD)), and P45 (flavin adenine dinucleotide H$_2$ (reduced form) (FADH2)). They correspond to sources (P1, P34, and P42) and sinks (P37 and P45). Not surprisingly, the entry point, the acetyl-cofactor, coenzyme A, (P1) occurs only once and is the carrier of a high energy form of the pyruvate from glycolysis. This compound is converted by the cycle to CoA. The other species produced that occur only once are the two pairs of molecules involved in the reduction process, the GDP/GTP (P34/P37) couple and the FAD/FADH$_2$ (P42/P45) couple. This observation corresponds to the provision of energy to reduce FAD to FADH$_2$ only once and the production of GTP from GDP only once. Recall that complex formation is composed of two two-cycles involving both forward and backward pathways. Because the choice of starting-point and end-point is arbitrary, only 5 two-cycles are unique.

As depicted in FIG. 23, of particular interest are the positive (forward-paths-only) cycles. Of all of the 15,893 unique minimal cycles, there are only 11 forwardly positive cycles as represented in FIG. 23. They include the forward paths through the eight subreactions. The longest of these 11 positive cycles, with 43 places, is identified as the "backbone" of the Krebs cycle. It should be appreciated that the evaluation identified two additional forward-only cycles that are variants of the forward paths associated with subreaction 5 and this backbone cycle. These variations are the result of the cross-coupling bypass provided by the nucleotide cofactor CoA. Note that the five species identified in the previous description of the minimal two-cycles are not to be found in any of these 11 unique positive minimal cycles. Recall that these species—P1, P34, P37, P42, and P45-appear only once as two-cycles in the complete listing. While these species are critical to the functioning of the Krebs cycle, as sources (P1, P34, and P42, i.e., acetyl CoA, GDP and FAD) and sinks (P37 and P45, i.e., GTP and FADHZ), the Krebs cycle does not pass "through" them. They are species in complex formations. Some have forward paths into the species followed by a backward path out, or vice versa, but no forward path leads into them followed by a forward path out.

As shown in connection with the analysis of representation 300, the hyperdigraph approach can be used effectively to provide insight into the behavior of a biochemical system. The same evaluation technique can be used to analyze other biochemical systems of interest. Indeed, referring back to FIG. 2, in other embodiments this evaluation technique can be applied in fields other than biochemistry in operation 128 either with MCL processing in operation 126 or without it.

In one further embodiment, a computational model for the identification of pathways of interest in an electric power grid is prepared and evaluated using routine 140 of FIGS. 8 and 9. This modeling of an electric power grid facilitates combinatorial and topological structural considerations. The resulting electric power grid model can be evaluated in terms of both physical and economic aspects. Excursions in complex electric power grids occur for a wide variety of reasons, some of which seem to be attributable to incorrect or inconsistent simulation. While simulators are used routinely for single-point-failure contingency analysis to qualify control systems, simulation of multiple simultaneous failure points is generally not accommodated. Moreover, control of profitability and asset utility optimization is not generally possible with such simulators.

Figure 24:
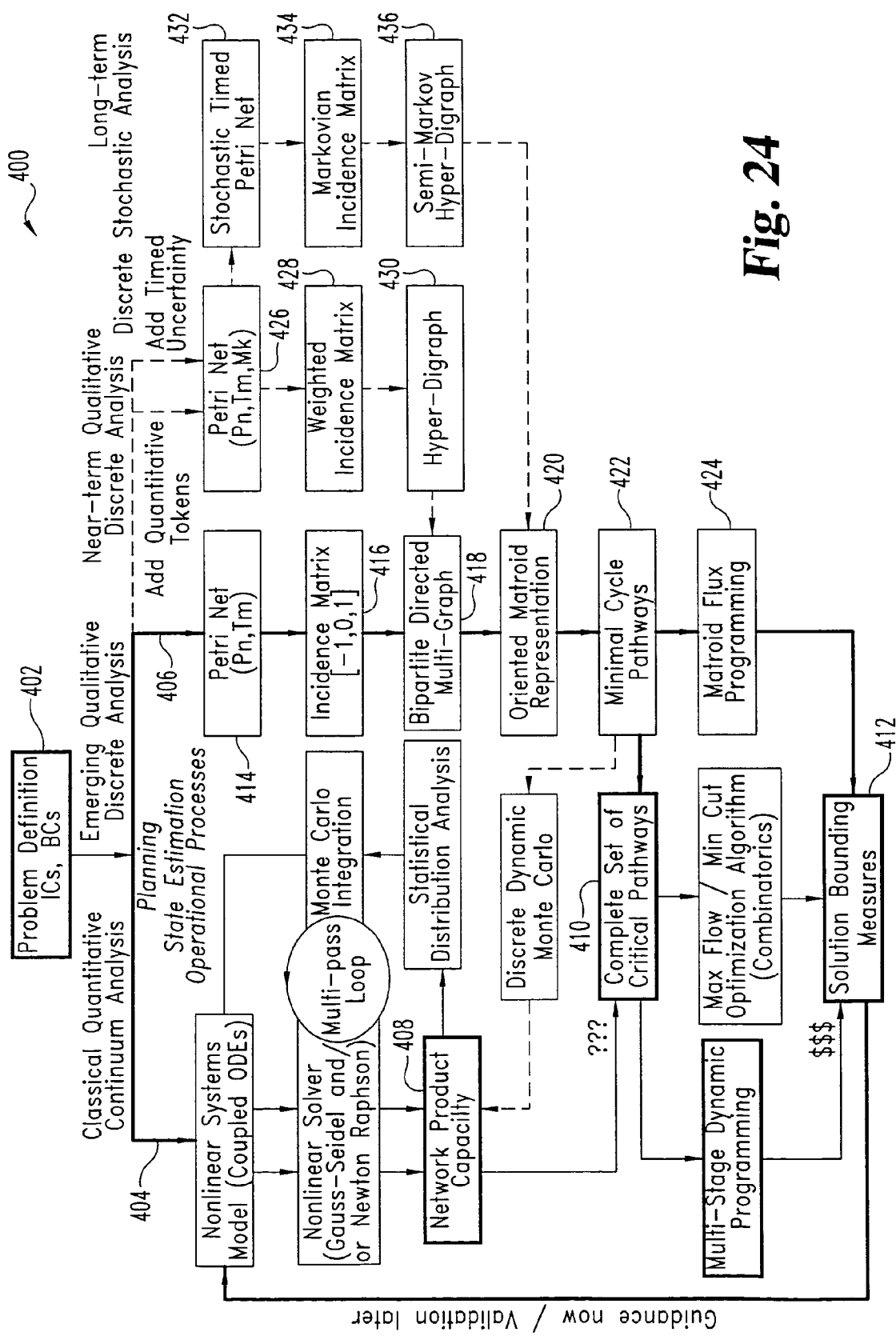
FIG. 24 is a control flow diagram for electric power grid evaluation process that includes application of the procedure of FIG. 2.

FIG. 24 provides a diagrammatic evaluation process 400 relating to both discrete and continuous network evaluation approaches. In process 400, from the problem definition in stage 402, standard quantitative continuous analysis techniques are processed from branch 404 and discrete analysis techniques using Petri nets are processed from branch 406. The near-term extension to the conjunction of topological network invariants with network flow invariants defined by a Petri net model using multigraphs and oriented matroids, introduces quantitative flow information via tokens and markings. Ultimately, the long-term discrete stochastic analysis extension includes timed uncertainty in the knowledge of the information modeled in the network; where the information is the commodity. Second, process 400 provides sequential stages required to answer specific questions which are relevant to a host of industrial, commercial, financial, national and homeland security missions. Process 400 has been developed not only for econophysics considerations, but also for similar networks developed for the study of biochemical species as previously described. Whether one is analyzing the impact of the disruption of the power grid due to a natural or man-made disruption or one is analyzing the impact of encouraging or disruption the supply of a molecular species in the fight against cancer, the discrete complement to the continuous methods of network analysis provides a more complete information-providing mechanism.

Three pathways for traversing the flow diagram of model 400 are illustrated in FIG. 24 in association with the following information nodes: (1) network product capacity in stage 408; (2) complete critical pathway in stage 410; and (3) the optimal solution bounding measures in stage 412. In the econophysics application, network product capacity, achieved via hill-climbing, translates into load flow and/or cash flow. The complete set of critical pathways is a listing of all of the pathways by which energy can get from one place to another and at what cost. The solution bounding measures are the inequalities defining the complete set of admissible solutions for the functioning of the power network or load flow limits. It describes both the stability and fault-tolerance of the coupled network, which in turn provides the mechanism(s) for taking the system from a less desirable state to a more desirable state.

To identify all of the principal flow pathways of the network, a discrete analysis includes the following: (1) build a Petri net in stage 414, (2) prepare a corresponding incidence (or connectivity) matrix in stage 416, (3) construct a bipartite directed multigraph in stage 418, (4) build an oriented matroid representation (which is analogous to a linear algebraic representation but with its own mathematical machinery and benefits) in stage 420, and (5) compute the minimal cycle pathways in stage 422 from which the principal flow cycles are identified. To evaluate load flow limits, which are presented as a set of inequalities, the minimal cycle pathways are submitted to a matroid-based flux solver in stage 424. Based on this information, these preprocessed limits can be fed into a continuous nonlinear systems model to determine an optimal load flow. The qualitative discrete analysis approach can be extended by the inclusion of the quantitative tokens that yield a weighted incidence matrix which, in turn, is expressed in terms of a hyperdigraph as reflected in stages 426, 428 and 430. This extension then joins at stage 418 previously described.

Another extension of the discrete approach incorporates timed uncertainty variable data into a discrete stochastic analysis in which the timed Petri net will be stochastic, the incidence matrix will be Markovian, and the hypendigraphs will be Semi-Markovian as reflected in stages 432, 434, and 436. This discrete stochastic analysis approach then rejoins the discrete approach machinery at stage 420; however, the result from the minimal cycle pathway analysis provides a discrete Monte Carlo analog, which would directly yield the load flows (as analogs of density measures for its associated channel capacity)—qualitatively, quantitatively and stochastically including uncertainty.

Within this context, a timed nondeterministic Petri net is considered equivalent to the underlying discrete Markov network that defines dynamic Monte Carlo network simulations. The initially qualitative model can be extended to the qualitative realm by the inclusion of tracking of physical entities in the network. The Petri net model of econophysics networks satisfies laws of conservation—of voltage, dollars, current flow, and cash flow by allowing only those firing sequences that obey the specified transition rules. Because the model can specify exact, discrete, small numbers of numbers, it is not subject to round off errors that might occur with continuous solution approaches for differential rate equations. Such errors can become undesirable under certain circumstances. Once initial quantities, i.e. initial and boundary conditions, have been specified, perturbations to the network can then be applied to the computational model.

Petri nets have been used successfully to model numerous operations research problems in process plant control models, e.g., chemical, mechanical, industrial, massively parallel computer message passing and resource allocation command, control, and communications for conflict simulations. The applications could also benefit from the techniques of the present application. Using Petri nets as a discrete network model to define a computational simulation framework, varied spatial and temporal granularity can be considered across different scales. With this multiscale model, the combined aspects of physical control and markets that influence control energy systems can be considered. In addition, the underlying mathematics of the coupled models can provide insight into how information complexity may be managed with existing computational machinery.

Our systems network model develops a novel mathematical/computational approach to modeling transactive control of the power grid network, in order to study the complex behavior of the economically-driven, market-responsive system. The governing conservation laws, for decision-making network models, are Kirchhoff s laws for electrical circuit model and market-clearing, price-determination for the economics model. These physical conservation laws are identified with a canonical set of network invariants.

As previously described, routine 140 can be used to determine the set of minimum flow closed paths in the physical network model based on a Petri net; where the Petri net has a faithful hyperdigraph representation that is obtained from a linear incidence matrix. A closed path is a loop in the hyperdigraph representation that indicates all of the places and transition rules encountered in the passing of information through the network from one place to another. No such path through the network visits the same node more than once, except for the start/end node. In the mathematical context, a closed path is called a circuit; but in deference to the disparate use of this terminology in the power grid community, the term "closed path" is alternatively used for this electric power grid application. These closed paths may also be referred to as cycles. For the electric power grid model, the identification of minimal closed paths is subject to the Kirchhoff s/market-clearing closed path conservation laws. The respective governing laws correspond to a set of algebraic network invariants.

With the Petri net evaluation model, the power grid can be reconfigured and analyzed to determine alternate paths if multiple failures, be they physical and/or financial, occur. Every alternative path can be identified based on a cut-set of path edges. Any closed path can be identified from the Petri net analysis that is required for the entire power grid system to be stably sustained. The model can act as a preprocessor for selected code suites, e.g., GEs commercial power flow system software suite called Positive Sequence Load Flow/Positive Sequence Dynamic Simulation (PSLF/PSDS). It can speed up the accurate convergence of the other solvers/simulators, and it can extend workable grid size limitations. Also, the model can optionally provide contingency fault-tolerant diagnostics with optimized simulation capacity, i.e., minimum cut/maximum flow. S-supports associated with the model identify the smallest current-bearing, positive, closed-regions (islands) that yield the greatest capacity (optimal in the sense of compact). S-supports are regions on which the conservation laws hold locally and generalize the notion of closed paths. S-invariants are local conservations laws that hold on islands of the net. Kirchhoffs (current loop) Law is a global S-invariant. This is essential to globally maintaining Kirchhoffs Law. Many of the power flow tools available today are able to perform analyses required to determine the local stability of the network. One strength of this approach, either taken independently or used as a pre-processor for a traditional power flow software suite, is in its ability to analyze the global stability of the system, even when subject to numerous failures and/or the participation of multiple independent small transmitters/smart appliances. Examples of power grid system information parameters include: the power grid configuration and its physical parameters (LRC circuit and/or Kirchhoffs current, voltage and resistance laws), system communications protocols, control laws or operational constraint rules, computational hardware and software specifications, and economic parametric data that represents the integrated wholesale/retail energy market and its associated futures pricing options.

The decision-making network model used in the evaluation is a Petri net of the type previously described; where places P are defined in terms of counting arrangements of tokens in marked placeholders (state attributes) that could be representative of physical packets of electrical energy in the decision-making network model of the power grid or a symbolic representation of electrical power as a commodity with price options that change over time. The partitions of multisets of physical energy packets or energy commodities can be arranged into the set of marking place holders of kinetic transport-diffusion-like reactions. Accordingly, routine 140 provides a cycle decomposition of the Petri net model of a power grid into an n-set of subcircuits. The complex operational processes associated with these decision-making networks lend themselves to being faithfully modeled by the algebraic-combinatorial state (and transition) invariants of the Petri nets. In all generality, a Petri net is a directed, simply-connected bipartite graph, composed of nodes (vertices) and edges. The directed edges of a Petri net connect place nodes P to transition nodes t and are typically referred to as arcs. For example, a state may represent an electric meter that measures the current flow to an appliance/equipment. The state attributes may be the output measurements of voltage and current and the transition rule may be a simple on/off Boolean switch or may be the local controller of a smart appliance/equipment that regulates the graded flow of electric current contingent upon other network load demands and/or economic considerations. From an operational control systems theory point-of-view, the transitions act as the control laws for the system whereas the places act as the state variables in the Petri net representations. In this graphical representation, information, either physical or economic, about the power grid moves from one state to another subject to a transition rule based on conservation transport laws in kinetic equilibria.

As previously described in connection with routine 140, a hyperdigraph is a mathematical data structure analogous to the graphical Petri net representation. A hyperdigraph mathematically conveys connectivity and direction, being composed of two sets: a vertex set and an edge set; where each edge consists of a subset of the vertex set with each element having an associated sign, indicating directionality. From this mathematical model, decomposition into the unique minimal cycles is performed. It should be appreciated that places P (such as setpoints, taps, switches, ask/offer prices, etc.) represent the state of the network, and transitions t (voltage, generators, economic transactions, etc.) represent the rules governing flow in the system. In modeling a pathway with a Petri net, we represent loads (here feeders, lines, ground, etc.) by places in the net and voltage events by transitions. As used in this context, a voltage event refers to any interaction that moves a commodity through the system and/or may be represented by a physical process. In addition to its topology or connectivity, a Petri net at a given time has a state or marking that is specified by the number of tokens (here, for example, MegaWatts (MW)), contract, bill sent in the mail, signal from a thermostat, bit packets for command & control communication, etc.) in each place P. Markings can be thought of as tokens representing information.

A state of a place that produces information is referred to as a source; and a state of a place that consumes the information is a sink. Flux conservation is achieved when the rate at which tokens are being produced equals the rate at which tokens are being consumed. When the flux, for a given firing sequence, starts and ends at the same point, it is called a cycle. Cycles are of interest because they represent the paths by which the network is passing as well as conserving information.

In connection with power grid modeling by a Petri net, certain mathematical aspects are further considered. For a Petri net, given a set of place nodes P1, ... ,Pn and a set of transition nodes t1 ... ,tm, the number of tokens for place Pi (i=1,2, ... ,n), a positive integer, corresponds to the cardinality of Pi. The marking M of a Petri net is denoted by an n×1 vector, such that n counts the number of places Pi where the cardinality of each place Pi corresponds to the number of tokens in Pi. The marking M of the Petri net evolves as the number of tokens decreases in some places, while increasing in other places. The initial state of the Petri net is given by the marking $M_0$. For a specific Petri net and a set of connectivity constraints, the corresponding incidence matrix N and marking vectors $M_0$, M can be constructed. The incidence matrix N and its transpose $N^T$ are n×m and m×n matrices, respectively, whose elements i,j each denote the change in the number of tokens in place j due to some state transition in transition i. The state of a Petri net is determined by the cardinality of the places, i.e., the marking, where the cardinal number of any place Pi counts the number of tokens for such place. The state representation of any Petri net, with a set of m places and a set of n transitions, is given by a state equation of the following type: $M_k = M_{k-1} + N^T v_k$, where k=1, 2, ... ". The index k counts the state transitions between places within the Petri net. For every k, there exists a marking $M_k$, which determines the $k^{th}$ state transition between transition ti and place Pj. The control vector $v_k$ is an n×1 vector that indicates the conditions of the transition $t_k$, which were satisfied at the $k^{th}$ state transition. The control vector $v_k$ is a unit vector that contains the entry 1 in a position for which the transition was satisfied, indicating when a state transition was enabled, and 0 otherwise.

If any marking $M_n$ is reached from some initial marking $M_0$ by a set of state transitions, $\lambda = \{v_1, v_2, \ldots, v_k\}$, then expression (1) results:

$$M_n = M_0 + N^T \sum_{k=1}^{n} v_k \qquad (1)$$

Next, let w be a n×1 transition count vector, defined by expression (2) as follows:

$$w = \sum_{k=1}^{n} v_k, \qquad (2)$$

where: w is a solution vector that counts the set of transitions that must be satisfied such that the state transitions begin with some $M_0$ and halt on the same $M_0$. An element n in w counts the number of times a transition is satisfied, so as to transform $M_0$ into $M_n$. When w is substituted into the marking equation, $M_n - M_0$ is identified with $\Delta M$ to obtain the following expression (3):

$$N^T w = \Delta M \qquad (3)$$

A Petri net is bounded if all of the readable markings of the net are such that the number of tokens in each place has a finite value. A Petri net is said to be structurally bounded if f there exists an m-vector v of positive integer values such that $N^T v \leq 0$. The bounds on the set of places P1, ... ,Pm is determined by the following expression (4):

$$M_p \leq \frac{M_o^T}{v(P)} \qquad (4)$$

where: M(P) is any reachable marking for some place P and v(P) is given as the Pth element in the solution vector v.

As previously considered, network cycles are found with the incidence matrix; where the rows are labeled by the places and the columns are labeled by the transitions. If information is flowing from a state to a transition, the entry is −1 (representing a loss); if the flow is from a transition to a state, the entry is +1 (representing a gain); and the entry is zero otherwise. Once the incidence matrix is generated, the nullspace can be found by finding solutions of $N^T v=0$; where N is the incidence matrix. S-invariants are defined by solutions to the equation $N^T v=0$. The nonzero entries in v determine the set of places whose total token count does not change with any firing sequence from $M_0$. This set of entries is referred to as the support of the S-invariant. Observe that $M^T v = M_0^T v$ is true for every M that is reachable from $M_0$. T-invariants are solutions to the equation $N^T w=0$, $w \geqq 0$. The solution vector w counts the set of transitions that must be satisfied such that the state transitions begin with some $M_0$ and halt on the same $M_0$. In this application, the S- and T-invariants correspond to conservation laws. S- and T-invariants determine the pricing options/energy fluxes required to balance the network equations and to determine system set points.

For the electric power grid Petri net model, two state nodes are connected subject to a transition node if it is possible for the second state to receive information from the first state through some physical/economic mechanism, which is theoretically reversible. It should be appreciated that the actual amount of power or commodity system reversibility may be very small and is dependent on the steady-state condition and/or kinetic rate constants. Because all of the interactions under consideration are potentially reversible, then these paired sets of transitions are identified explicitly. Each constituent subcircuit in the corresponding hyperdigraph of the network model satisfies a flux conservation law, which for the physical power grid model is, in fact, Kirchhoffs circuit current law. It is within this context that a discrete state-variable representation of a decision-making network model is constructed to evaluated local and global control laws. The derivation of control laws for grid operations can initially be obtained by combining predictive results of either the continuous Black-Sholes model or the binomial lattice model of economic predictors.

Subordinate to operation 128 of procedure 120 (FIG. 2), a Petri net representation of an electrical power distribution network is constructed per operation 142 of routine 140 (FIGS. 8 and 9). A corresponding incidence-connectivity matrix is generated with the signed set (+1, −1, 0) per operation 144 of routine 140. Per operation 146, a corresponding hyperdigraph (directed hypergraph) representation of the Petri net is provided such that the incidence (connectivity) between vertices and edges is defined by positive and negative signs. The hyperdigraph is transformed in the manner previously described, and an oriented matroid representation of the hyperdigraph is constructed; where an oriented matroid is a combinatorial geometric object that is used to define algorithms that enumerate all of the minimal spanning connectivities (subcircuits) of the hyperdigraph. Per operation 148, the cycle basis of this oriented matroid is determined to obtain the set of minimal cycle pathways. Per operation 150 and subroutine 160 (FIG. 9), the occurrence of each minimal basis cycle in the hyperdigraph corresponds to the same rank ordered minimal basis cycle in the transformed graph. The unique collection of distinct minimal cycles is the complete listing of closed walks that collectively move information through the network. The minimal pathways are the shortest, non-repeating, non-looping, non-revisited paths. All other cycles in the hyperdigraph can be generated from linear combinations of this set of minimal cycles.

After execution of routine 150 (including subroutine 160) under operation 126 of procedure 120, procedure 120 continues with operation 130 which uses the results of subroutine 160 to perform an evaluation. The identified rank ordered minimal cycle basis elements-set of minimal cycle pathways can be used to build a complete descriptive database of the networks minimal cycles. With the set of minimal cycles identified, search strategies can be specified as linear objective functions over the database—the flow network can be analyzed to identify the set of paths which are of particular interest via optimization analysis using path algebras, linear programming and/or oriented matroid programming.

The S- and T-invariants correspond to the well known Kirchhoff conservation laws. This identification implies that the set of minimal cycle paths generates a minimal cycle (path) decomposition of the Petri net, determines the cycle representation of the local network places that are stationary (in a state of flux equilibrium), and establishes computational hypothesis tests, cast as multistaged oriented matroid programming optimizations, to test the flow characteristics of the power grid network, subject to minimal path cycles (circuits) that decompose the power grid network.

Under operation 130, the database of minimal cycles can be used to formulate multistage optimizations of parametric power network flows. These types of optimizations can be regarded as hypothesis tests to evaluate both the topological structure and operational stability of the power network. These optimizations include maximum flows and minimum cuts. As part of the evaluation, infrastructure of interest can be identified, such as distribution circuits in the power distribution network, and can demonstrate how effective and how sensitive the power network is to perturbations and faults (natural and man made). A multistage economic decision making network pricing model of the futures trading of electrical power commodities can likewise be prepared that establishes economic transitions. These physical and economic models can be combined to explore forced feedback and control that the coupled networks impose on each other.

The continuum of differential equations that model the coupled power grid distribution system and the commodity futures pricing game models are highly nonlinear, with disparate spatial and temporal parameter scales. Coupling both decision making network models can result in different scales, such that the system units of state and transition vectors from the coupled decision making systems are mismatched for appropriate integration together. One approach to this situation provides that the physics-based decision making network be represented in a low dimensional parameter space with the economics decision making network being realized as a higher dimensional second order logical instantiation of the low dimensional physics based decision making network. The economics of commodity flow is then realized as a higher dimensional set of decision making rules that are functionally defined in terms of the lower dimensional roles that govern the physics based decision making network. If these assertions are cast in terms of the discrete dynamic systems models of decision making, rules governing the economics of commodity distribution are seen as a higher dimensional flow space group of actions with global parameters in the discrete dynamics phase space acting on the lower dimensional parameter flows of the physics-based discrete network.

For embodiments including a coupling of the electric power grid and its economics, modeling in terms of like units is provided. It is recognized that the power grid is typically described in terms of voltage in units of volts and electric current in units of amperes (amps), and the economic aspects are typically described in terms of dollars, which are computed by multiplying the cost per MegaWatt (MW) by the MWs used—such that economics can be described in terms of dollars ($) per MW. Because power (watts) is determined from the product of potential (volts) and current (amperes), it is a second order affect which is computed, not measured. The sum of the current around (into and out of) a place is equal to zero, which corresponds to the S-invariant. The sum of the voltage around a closed pathway is equal to zero, which corresponds to a T-invariant. The market clearing process requires a balancing of the books at a given moment around a closed pathway, and is expected to correspond to another T-invariant. Transformation between the electric power information to the dollars of economics can be based on a mapping, such as that represented by Table II as follows:

TABLE III

| Physical Power Grid | Economics |
|---|---|
| $PG_1$(voltage = V, current = I) | $E_1$(Dollars = \$, Mega Watts = MW) |
| ↓ | ↓ |
| $PG_2(\$,(v*I))$ | ← → | $E_2(\$,(V*I))$ |

In Table II, the rules of trading are related to the rules of the physical power grid. The economic model only exists as a function of the study of the physical behavior of the system and are subject to physical constraints. The economic information is included as an additional transition rules on the places of the physical grid. In other embodiments, a different coupling may be alternatively or additionally utilized.

Figure 25:
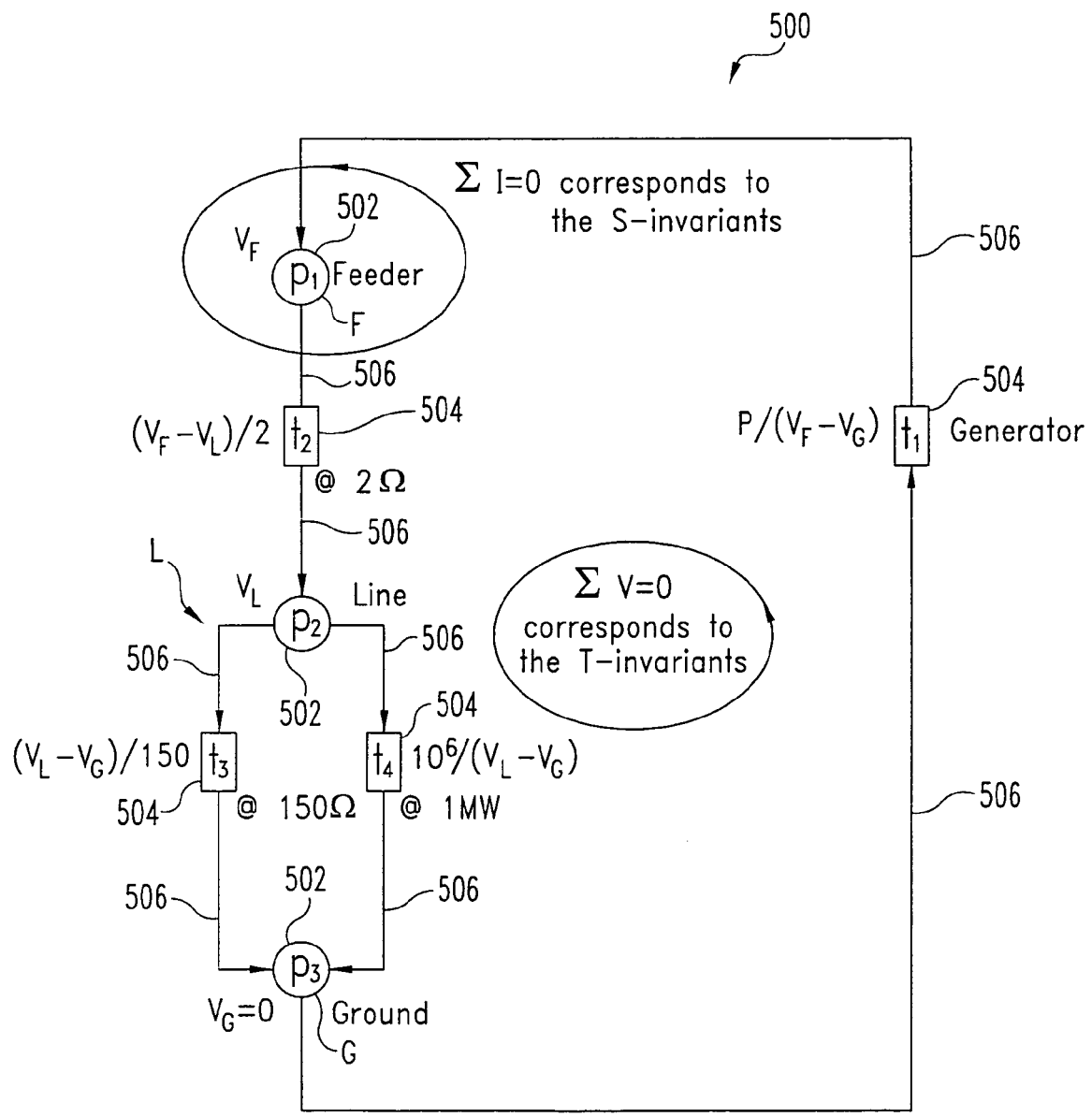
FIG. 25 is a Petri net representation of an electric power circuit.

Referring to FIG. 25, a Petri net model for the purpose of illustration is shown as electrical power flow circuitry network 500. Network 500 includes places 502 (also designated P1, P2, and P3), transitions 504 (also designated t1, t2, t3, and t4), and corresponding interconnecting arc links 506 that correspond to Petri net arcs. It should be understood that the voltage at electrical ground is zero (Vo=0). The corresponding incidence matrix, which is a 3×4 matrix, is provided in expression (5) as follows:

|    | t1 | t2 | t3 | t4 |     |
|----|----|----|----|----|-----|
| P1 | +1 | −1 |  0 |  0 |     |
| P2 |  0 | +1 | −1 | −1 | (5) |
| P3 | −1 |  0 | +1 | +1 |     |

This matrix has three rows associated with the three states at the feeder F, the load L, and the ground G and four columns associated with the voltage in each of the four lines. Note the power flow circuit equation matrix is actually the product of a flow direction matrix which is 3×3 and a 3×1 vector containing the conservation of voltages, as provided in the following expression $$\begin{bmatrix} +1 & -1 & 0 \\ 0 & +1 & -1 \\ -1 & 0 & +1 \end{bmatrix} \begin{bmatrix} P/V_F \\ (V_F - V_L)/2 \\ (V_L/150) + (10^6/V_L) \end{bmatrix} = \begin{bmatrix} 0 \\ 0 \\ 0 \end{bmatrix} \quad (6)$$

From an operational control systems point-of-view, the transitions act as the control laws for the system whereas the places act as the state variables. The Petri net is a combinatorial abstraction of the interactions defined over a physical power grid space where the transitions define the operational conditions or rules that must be satisfied for communication of information to occur. In this graphical representation, a physical entity of power or an economic unit moves from one state to another subject to a transition rule based on equilibria. The power or dollars do not pass formally through the transition, but rather are subject to the rule(s) described by the transitions.

Figure 26:
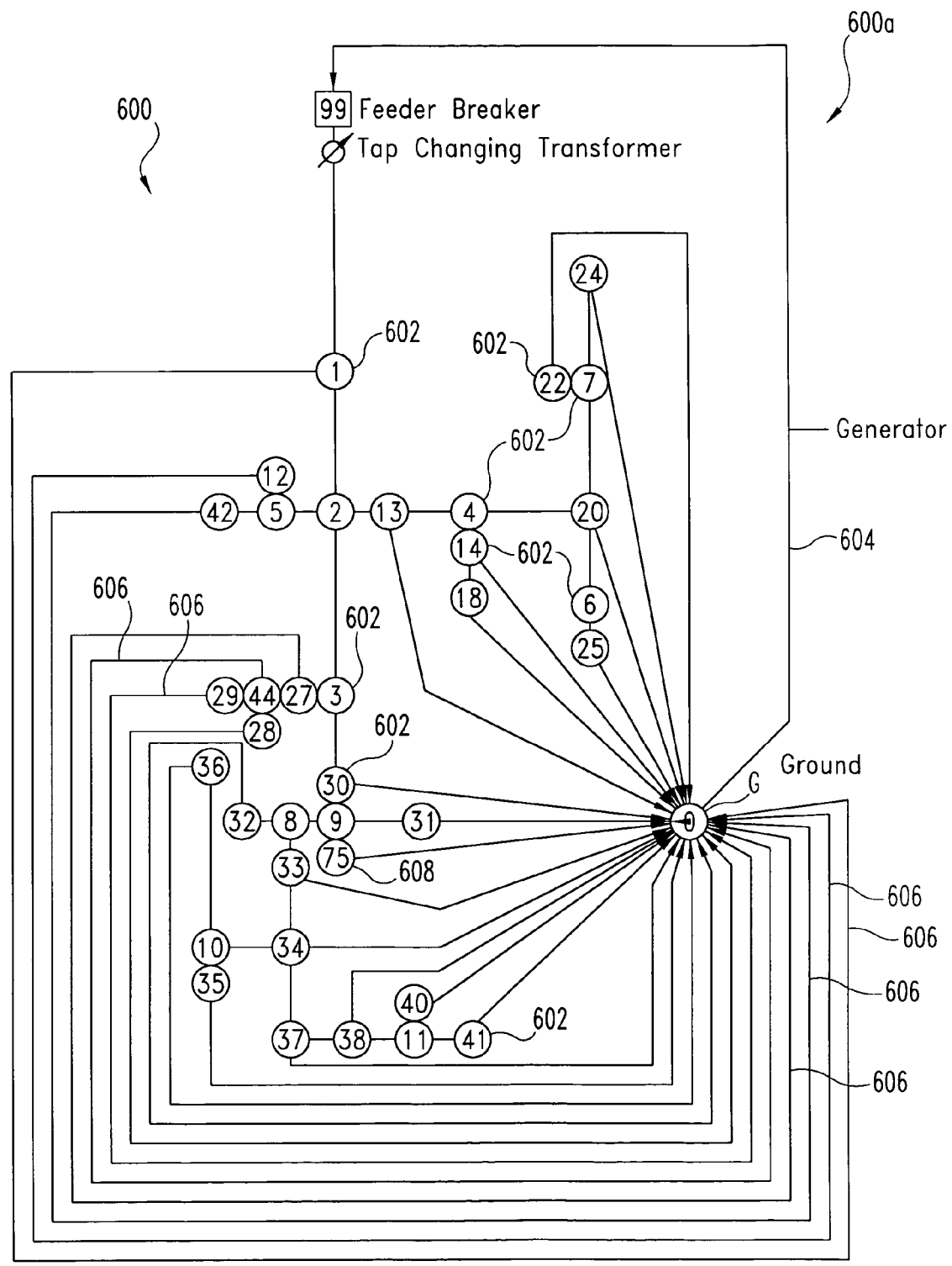
FIG. 26 is schematic view of one type of electrical power grid distribution network.

In the next example, an IEEE standard 37 bus delta radial distribution feeder is evaluated. FIG. 26 schematically depicts a corresponding power grid network circuitry 600. Each bus 602 is represented by a unique number, only a few of which are designated by reference numerals to preserve clarity. Generator 604 is depicted between a feeder breaker switch modeled as a place P99 and electrical ground G, also labeled as a place P0. Twenty-five of buses 602 have loads on them and are connected to ground G. A few representative network links 606 are depicted that interconnect the loaded buses 602 to ground G, and correspond to conductive pathways of the power grid network circuitry 600. An induction motor 608, which is a load and is therefore connected to ground G, is labeled as place P75. The remaining ten buses, numbered two through eleven inclusive, are nonload bearing junctions. In FIG. 38, the physical separation distances are generally drawn to proportion unless the places (buses) are too close together to provide a clear distinction. For example, P9 and P75 have a separation distance of only one foot.

Figure 27:
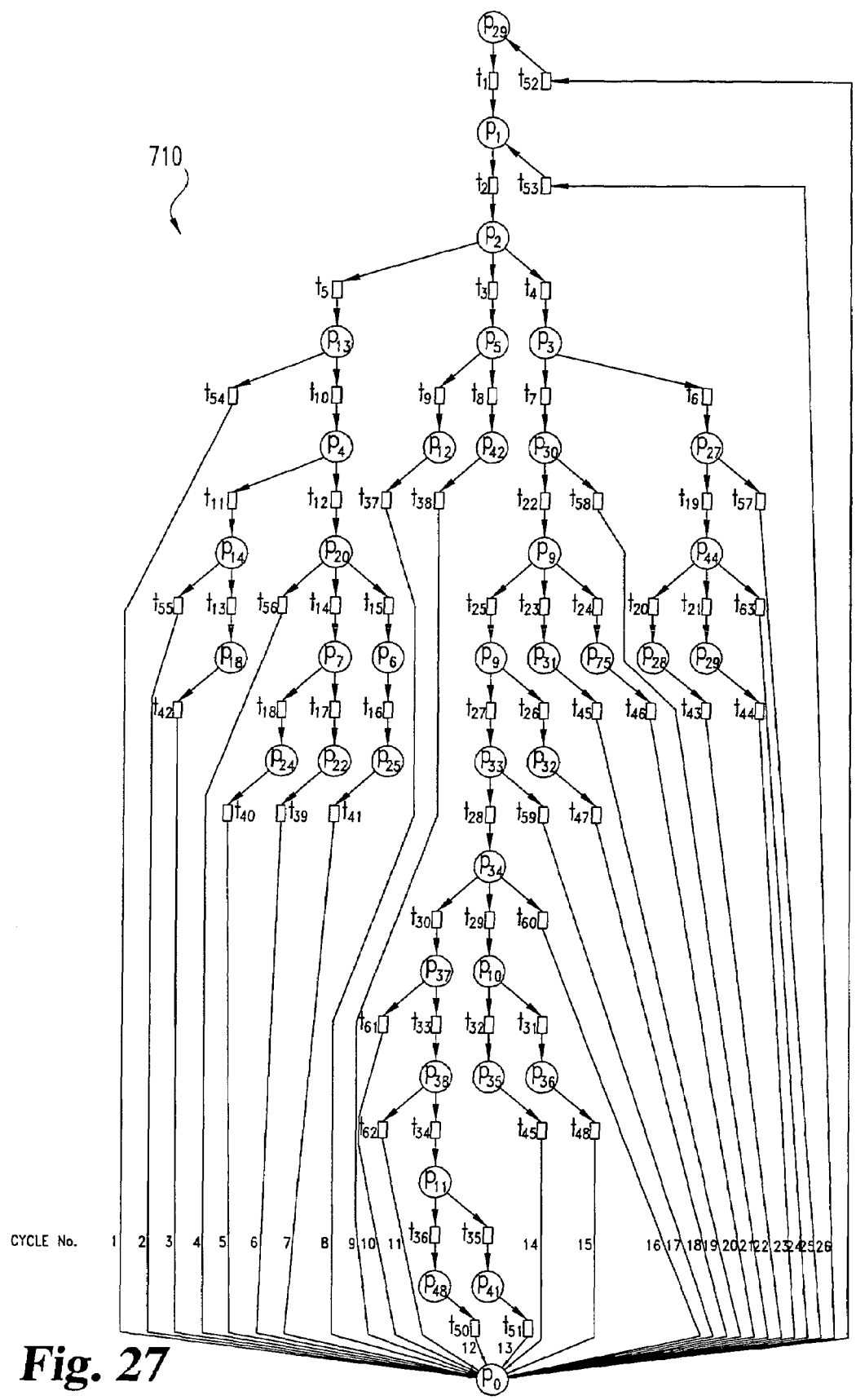
FIG. 27 is a Petri net representation of the network of FIG. 26.
Figure 28:
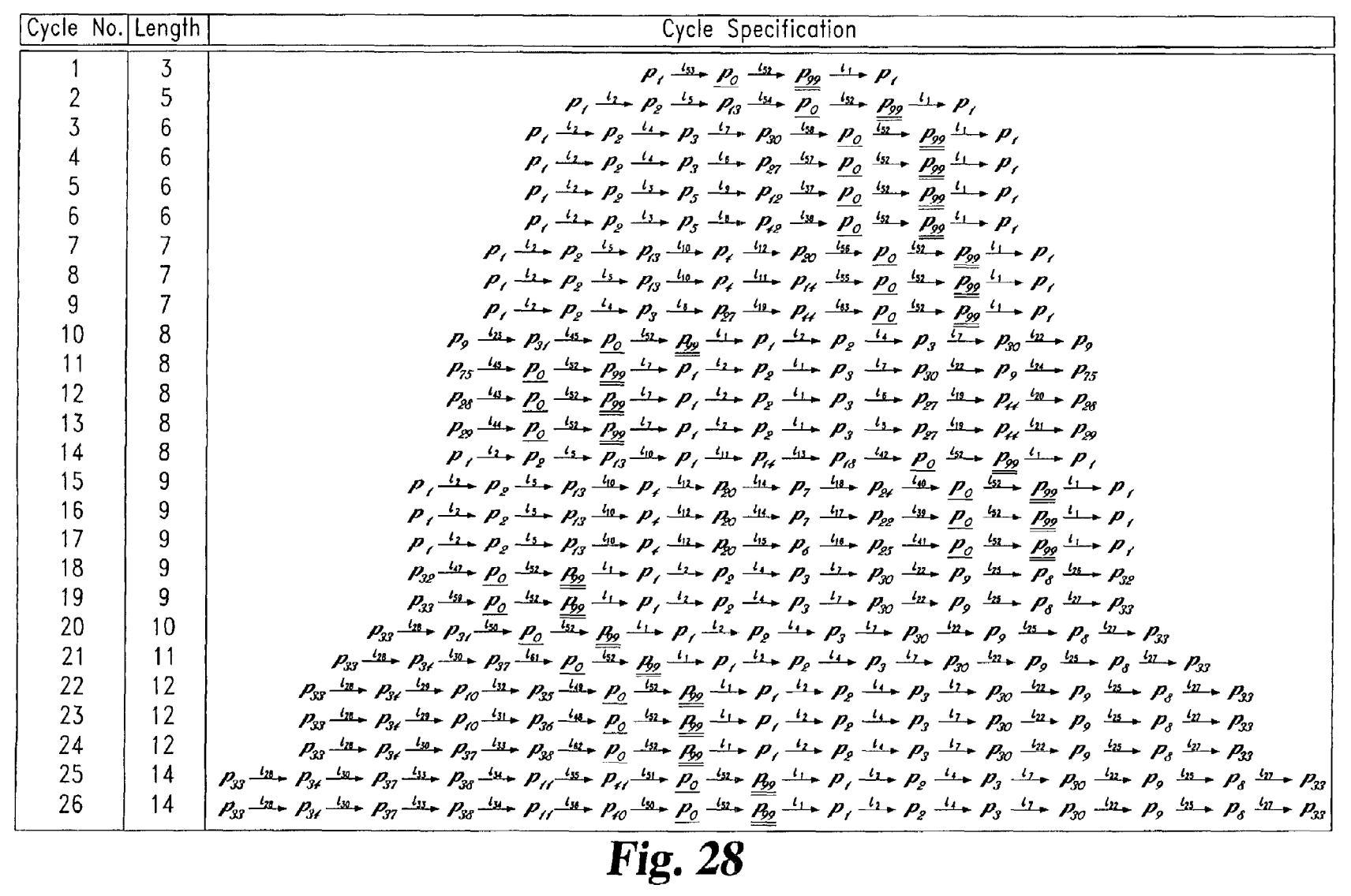

FIG. 27 depicts Petri representation 610 corresponding to network 600 (also designated system 600a). There are n=38 places and m=63 transitions in representation 610. Representation 610 does not retain proximity information. The bus numbers were used to label the places, so the places appear in no apparent order. The direction of flow of information is assumed to flow from the feeder breaker at place P99 to the other places in the network, and to ground G at place P0 if the places are loads. The root of the tree is the ground state of place P0 with the principal flow direction passing through the feeder breaker p99 and continuing in a tree-like fashion through the representation 610. The resulting incidence matrix was found to have a basis size of 26, the same number as the total of unique minimal cycles, which is coincidental. The 26 unique minimal cycles determined by the algorithm are labeled in FIG. 28. Note that there is a minimal cycle corresponding to each transition to the ground state P0. The number of occurrences of places in the 26 unique minimal pathways are provided in the listing of FIG. 29. The transitions, their number of occurrences in the 26 unique minimal pathways, and the percentage of occurrence are presented in the listing of FIG. 30.

Figure 31:
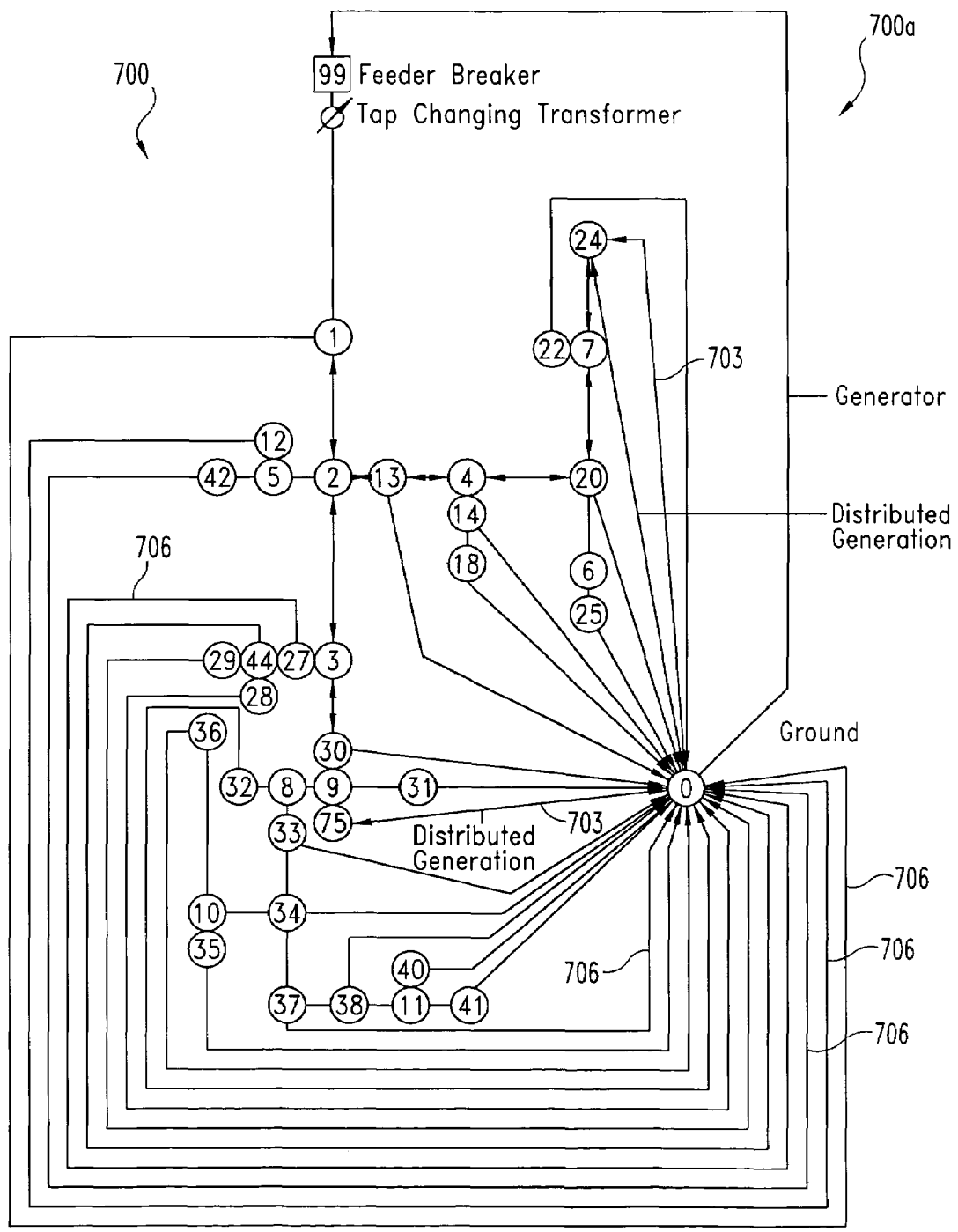
FIG. 31 is schematic view of another type of electrical power grid distribution network.
Figure 32:
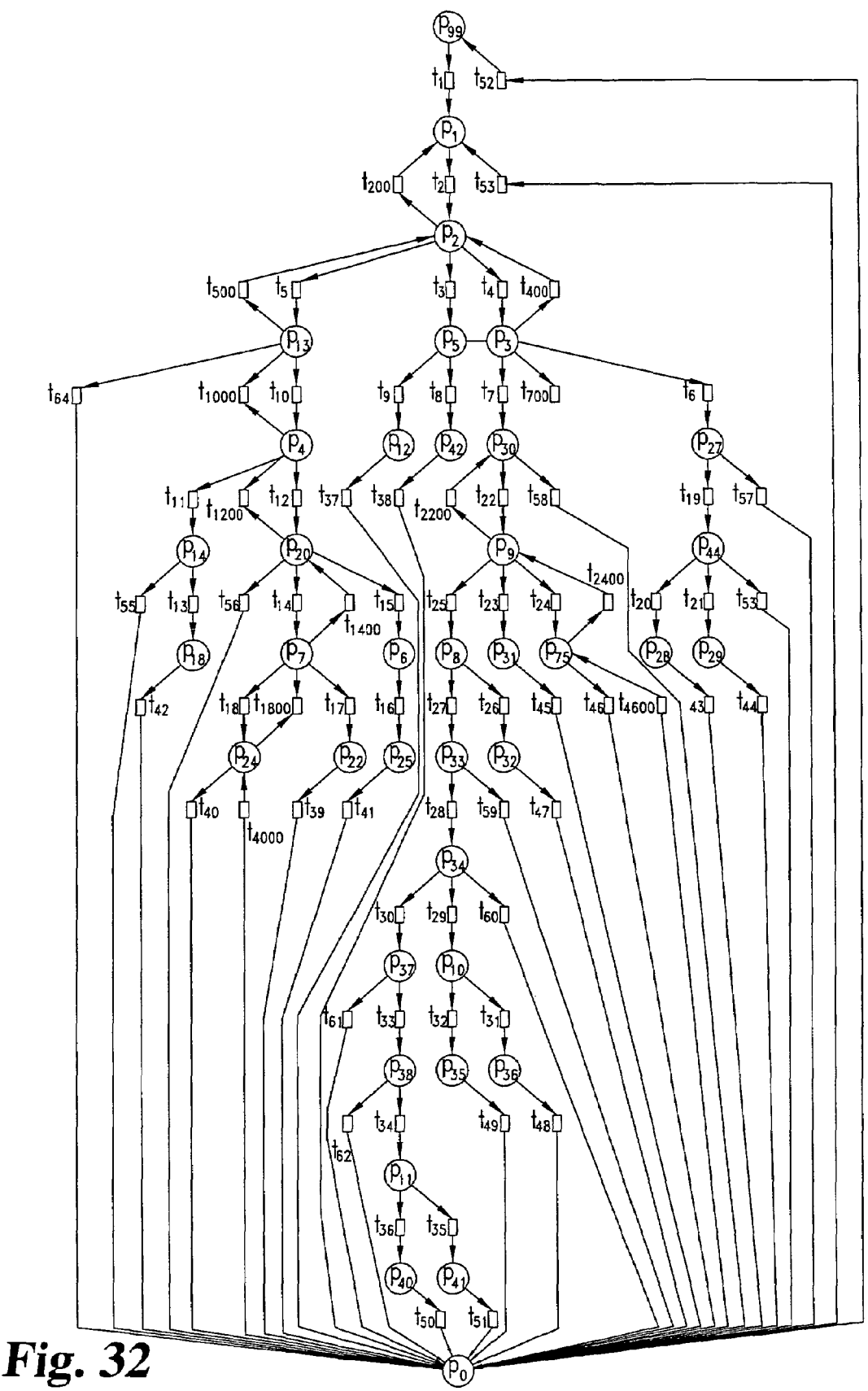
FIG. 32 is a Petri net representation of the network of FIG. 31.

In still a further embodiment, distributed electric power generation features are added to an IEEE standard 37 bus delta radial distribution feeder as depicted by the power grid network circuitry 700 shown in FIG. 31 using the same symbolism and as for network 600 with distributed generation being indicated by reference numeral 703. Circuitry 700 is alternatively designated system 700a. A few representative network links 706 are depicted that interconnect the loaded buses to ground G, and correspond to conductive pathways of the power grid network circuitry 700. As shown in the corresponding Petri net representation 710 of FIG. 32, there are 38 places and 75 transitions for network 700. Also, appropriate lines that bidirectionally carry information have arrows at both ends (double-headed); all other lines assume the flow from the feature breaker. The distributed generators have been added to places P75 and P24. Because no new states have been introduced relative representation 610, the basis size remains 26; however, twelve new transitions were added for the additional paths leading away from the distributed generators.

Figure 33:
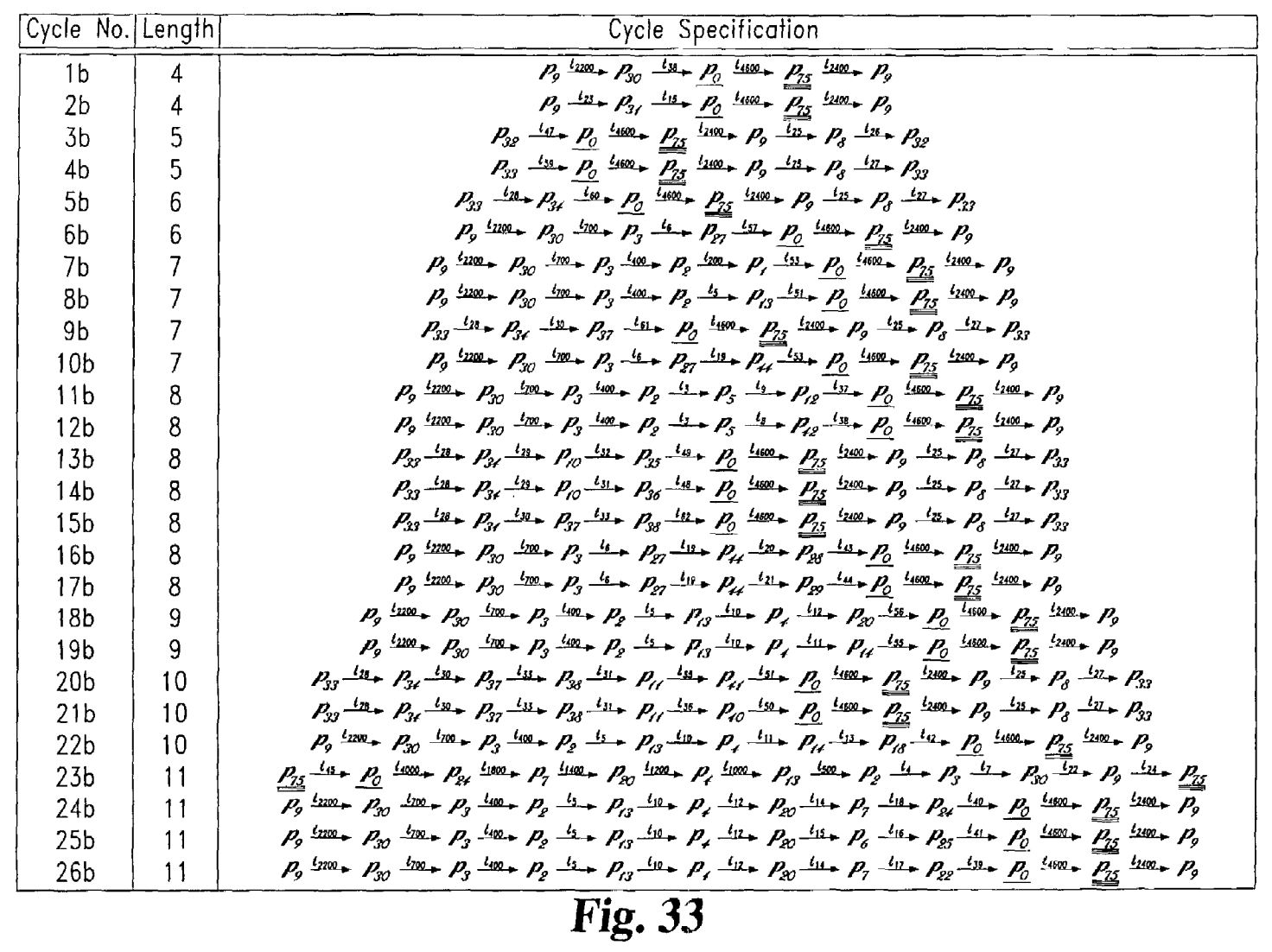
Figure 34:
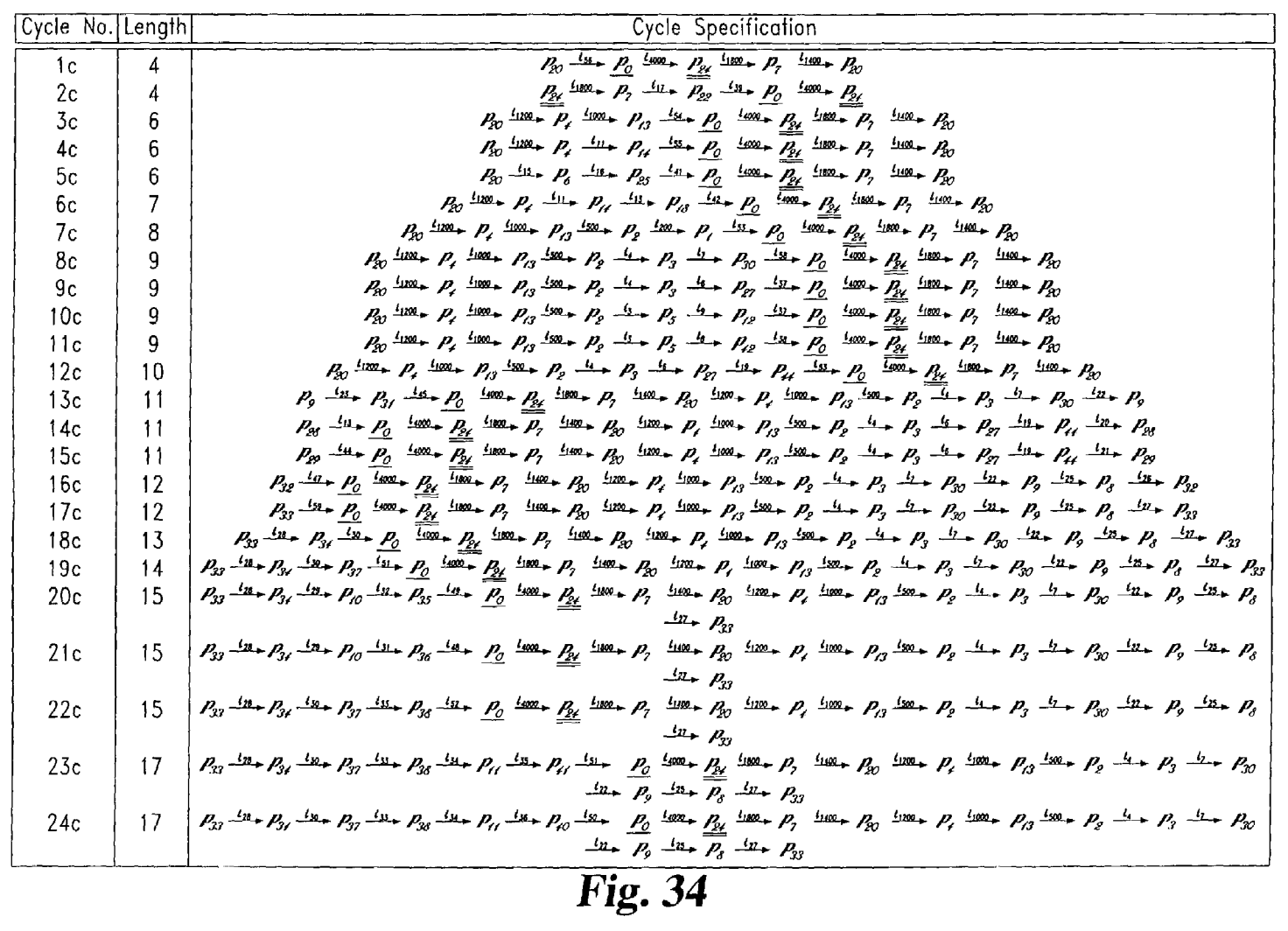

For the representation 710 of network 700, there are 88 unique minimal cycles determined in accordance with routine 140 of FIGS. 8 and 9. The minimal cycles are shown in FIGS. 33 and 34, which reveal 62 minimal cycles in addition to the 26 determined earlier for representation 610. Of the 62 additional unique minimal pathways, twelve are two-cycles resulting from the twelve reversed pathways introduced with the two distributed generators 703. The twelve two-cycles are presented in FIG. 35. The remaining 50 new unique minimal cycles contribute significantly to the evaluation of alternative pathways through the network, resulting from the addition of only two distributed generators.

Returning to FIG. 2, after the execution of routine 140 to provide the minimal cycle set, operation 130 is performed. In operation 130, the model is evaluated using the minimal cycle set as desired. This evaluation can include determining relative occurrence of places and transitions to identify potential "choke points" in the information/token flow. Furthermore, this evaluation can include selectively removing one or more places and observing the impact on the system and/or observing system response through the minimal cycle set to one or more perturbations to identify system strengths and weaknesses. Operation 130 can also include providing any desired operator output, such as graphic visualization of results and/or a print-out of processing results.

After the execution of operation 130, conditional 132 is encountered. Conditional 132 tests whether to continue procedure 120. If the test of conditional 132 is true (affirmative), then procedure continues, returning to operation 122. If the test of conditional 132 is false (negative), then procedure 120 halts.

Many other embodiments are envisioned. In one example, the network evaluation system is applied to a different physical network comprised of nodes and interconnecting links operable to communicate information, such as a computer network, a telephone network, a video or multimedia network, or the like. In another example, a network corresponding to distribution of a fluid such as a liquid or gas is provided. In still another embodiment, procedure 120 is applied to evaluate a network model of a group comprised of constituents/elements that exchange information in the form of signals, commodities, power, energy, or some different type of token. These constituents could be of any type and may be randomly arranged and/or spaced apart form one another to name just a couple of variations.

A further example includes: representing a physical network with a graphical data structure corresponding to a matroid, the physical network including several spatially separated nodes interconnected by a number of corresponding links, the corresponding links each operatively connecting two of the nodes to provide for network transmission between the two of the nodes; defining a number of closed pathways with the graphical data structure, the closed pathways each corresponding to a pathway through the network; and recursively processing the graphical data structure relative to a spanning tree data structure to decompose the closed pathways into a minimal cycle set representative of all pathways of the graphical data structure.

In a different example, a computer comprises means for representing a physical network with a graphical data structure corresponding to a matroid that includes several spatially separated nodes interconnected by a number of corresponding links. The corresponding links each operatively connect two of the nodes to provide for network transmission between the two of the nodes. The computer further includes means for defining a number of closed pathways with the graphical data structure that each correspond to a pathway through the network and means for recursively processing the graphical data structure relative to a spanning tree data structure to decompose the closed pathways into a minimal cycle set representative of all pathways of the graphical data structure.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
preparing a model of a physical system, the model corresponding to a graphical dataset defining a number of vertices each corresponding to a different system variable and a number of edges each corresponding to a conditional transition path between two of the vertices, the model defining a closed pathway structure including a plurality of closed pathways; and
decomposing the closed pathway structure of the model into a minimal set of fundamental cycles numbering less than the plurality of closed pathways, the fundamental cycles each being unique relative to one another, the decomposing of the closed pathway structure including:
identifying a number of unique two-cycles each including two different members of the vertices; and
successively evaluating different ones of the edges to identify the fundamental cycles belonging to the minimal set that each include three or more different members of the vertices.

2. The method of claim 1, wherein the decomposing of the closed pathway structure further includes:
preparing a matrix from the model;
determining a basis size of a nullspace of the matrix; and
preparing a spanning tree representation and adjoining each of the different ones of the edges to identify each of the fundamental cycles of the minimal set that include three or more of the vertices in one-to-one correspondence.

3. The method of claim 1, wherein the preparing of the model includes:
establishing a data structure corresponding to a multigraph representation of the system; and
transforming the multigraph representation into an undirected graph representation.

4. The method of claim 3, which includes:
preparing the multigraph representation from a hyperdigraph representation; and
determining a nullspace of a matrix corresponding to the undirected graph representation.

5. The method of claim 4, which includes providing the hyperdigraph representation from a Petri net representative of the system, the hyperdigraph representation corresponding to an oriented matroid.

6. The method of claim 1, wherein the system includes a physical network, the network including a number of spaced apart nodes in operatively coupled by a number of links.

7. The method of claim 2, wherein the physical network defines an electric power grid.

8. An apparatus, comprising: a device carrying operating logic executable by a computer to perform the method of claim 1.

9. The apparatus of claim 8, wherein the device includes a removable memory device.

10. The apparatus of claim 8, wherein the device includes at least a portion of a computer network.

11. An apparatus, comprising: a computer operable to model a physical network with a graphical data structure representative of a matroid, the physical network including several spatially separated nodes coupled together by a number of corresponding links, the corresponding links each operatively connecting two of the nodes to provide for network transmission between the two of the nodes, the data structure defining a closed pathway arrangement, the computer being operable to process the graphical data structure relative to a spanning tree data structure to decompose the closed pathways into a minimal cycle set representative of all pathways of the closed pathway arrangement.

12. The apparatus of claim 11, wherein the computer includes one or more processors and a removable memory device encoded with operating logic executable by the one or more processors to determine the minimal cycle set and store the minimal cycle set in a database form.

13. The apparatus of claim 11, wherein the data structure corresponds to a number of vertices connected by edges and the computer includes means for identifying a number of two cycles, the two-cycles each corresponding to a different pair of the vertices, and means for progressively evaluating different ones of the edges to identify members of the minimal cycle set that each include three or more of the vertices.

14. The apparatus of claim 11, wherein the computer includes:
means for representing the network with a first type of graph;
means for transforming the first type of graph to a second type of graph;
means for preparing a matrix from the second type of graph; and
means for determining a basis of a nullspace for the matrix, the basis corresponding to membership of the minimal cycle set.

15. An apparatus, comprising: a computer operable to prepare a model of a physical system, the model corresponding to a graphical dataset defining a number of vertices each corresponding to a different system variable and a number of edges each corresponding to a conditional flow path between two of the vertices, the model defining a closed pathway structure including a plurality of closed pathways, the computer being operable to decompose the closed pathway structure of the model into a minimal set of fundamental cycles numbering less than the plurality of closed pathways, the fundamental cycles each being unique relative to one another, the computer performing decomposition of the closed pathway structure by identifying a number of unique two-cycles each including two different members of the vertices and successively evaluating different ones of the edges to identify the fundamental cycles belonging to the minimal set that each include three or more different members of the vertices.

16. The apparatus of claim 15, wherein the computer is further operable to determine a matrix from the graphic dataset and determine a basis for a nullspace of the matrix.

17. The apparatus of claim 15, wherein the computer includes a memory and is operable to store the minimal set in a database form.

18. The apparatus of claim 15, the computer including means for evaluating a perturbation of the network based on the minimal set of the fundamental cycles.

19. A method, comprising:
representing a physical system with a graphic data structure corresponding to a number of vertices and a number of edges, the edges each corresponding to two of the vertices;
defining a closed pathway arrangement with the graphical data structure; and
for each different one of a number of unique fundamental cycles of the closed pathway arrangement, identifying the different one of the fundamental cycles as a function of a spanning tree representation and a different one of the edges, the fundamental cycles each including three or more of the vertices.

20. The method of claim 19, which includes:
establishing a matrix representation corresponding to the graphical data structure;
determining a basis size of a nullspace corresponding to the matrix.

21. The method of claim 19, wherein the vertices each correspond to a state variable of the system, the edges each correspond to a conditional transition path, and further comprising:
preparing the graphic data structure from a hyperdigraph representation; and
determining each of the two-cycles of the closed pathway arrangement.

22. The method of claim 19, which includes evaluating a perturbation of the system with the fundamental cycles.

23. The method of claim 19, which includes:
preparing a minimal cycle set including the fundamental cycles; and
determining frequency of occurrence of each different one of the vertices in the minimal cycle set.

24. The method of claim 19, wherein the system includes an electric power grid.

25. The method of claim 19, wherein the data structure corresponds to a multigraph representation of the system and which includes:
preparing the data structure from a Petri net representation;
transforming the multigraph representation into an undirected graph representation; and
determining a basis size for a nullspace of a matrix corresponding to the undirected graph representation.

26. A device including operating logic executable by a computer to perform the method of claim 19.

27. An apparatus, comprising: a computer operable to represent a physical system with a graphical data structure corresponding to a matroid, the graphical data structure corresponding to a number of vertices and a number of edges, the edges each corresponding to two of the vertices, the computer being further operable to define a closed pathway arrangement with the graphical data structure and identify a different one of a number of fundamental cycles by evaluating a different respective one of the edges with a spanning tree representation, the fundamental cycles each including three or more of the vertices.

28. The apparatus of claim 27, wherein the computer is further operable to determine a matrix from the graphic dataset and determine a basis for a nullspace of the matrix.

29. The apparatus of claim 27, wherein the computer includes a memory and is operable to determine a minimal set of the fundamental cycles that is representative of all pathways defined by the closed pathway arrangement and store the minimal set in the memory in a database form.

30. The apparatus of claim 27, the computer including means for evaluating a perturbation of the network based on the minimal set of the fundamental cycles.

* * * * *